United States Patent
Bae et al.

(10) Patent No.: US 7,706,401 B2
(45) Date of Patent: Apr. 27, 2010

(54) METHOD AND SYSTEM FOR PROVIDING INTERDOMAIN TRAVERSAL IN SUPPORT OF PACKETIZED VOICE TRANSMISSIONS

(75) Inventors: Kiwan E. Bae, New York, NY (US); Wade R. Alt, Arlington, VA (US); Alan B. Johnston, St. Louis, MO (US); James A. Robertson, The Woodlands, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1014 days.

(21) Appl. No.: 11/202,647

(22) Filed: Aug. 12, 2005

(65) Prior Publication Data

US 2006/0209794 A1 Sep. 21, 2006

Related U.S. Application Data

(60) Provisional application No. 60/601,256, filed on Aug. 13, 2004, provisional application No. 60/606,605, filed on Sep. 2, 2004.

(51) Int. Cl.
*H04J 3/16* (2006.01)
(52) U.S. Cl. .................. 370/466; 370/352; 370/401
(58) Field of Classification Search .................. None
See application file for complete search history.

(56) References Cited

U.S. PATENT DOCUMENTS

| | | | | |
|---|---|---|---|---|
| 6,985,479 B2 * | 1/2006 | Leung et al. | ................ | 370/352 |
| 7,139,841 B1 * | 11/2006 | Somasundaram et al. | ... | 709/245 |
| 7,243,141 B2 * | 7/2007 | Harris | ................ | 709/220 |
| 7,302,496 B1 * | 11/2007 | Metzger | ................ | 709/245 |
| 7,328,280 B2 * | 2/2008 | Takeda et al. | ................ | 709/245 |
| 7,380,011 B2 * | 5/2008 | Li et al. | ................ | 709/227 |
| 2003/0007482 A1 | 1/2003 | Khello et al. | | |
| 2004/0003114 A1 | 1/2004 | Adamczyk | | |
| 2004/0131165 A1 * | 7/2004 | Ebisawa et al. | ................ | 379/93.07 |
| 2004/0139228 A1 | 7/2004 | Takeda et al. | | |
| 2004/0139230 A1 | 7/2004 | Kim | | |
| 2005/0254482 A1 * | 11/2005 | Yeom | ................ | 370/352 |
| 2005/0259637 A1 * | 11/2005 | Chu et al. | ................ | 370/352 |
| 2005/0286538 A1 * | 12/2005 | Oberle et al. | ................ | 370/395.54 |

(Continued)

FOREIGN PATENT DOCUMENTS

WO WO/02/076049 9/2002

OTHER PUBLICATIONS

Srisuresh, "Traditional IP Network Address Translator (Traditional NAT)", Internet Engineering Task Force, Request for Comments 3022, Jan. 2001.

(Continued)

*Primary Examiner*—Bob A Phunkulh

(57) ABSTRACT

An approach provides interdomain traversal to support packetized voice transmissions. A request for establishing a voice call is received from a source endpoint behind a first network address translator of a first domain, wherein the request specifies a directory number of a destination endpoint within a second domain. A network address is determined for communicating with the destination endpoint based on the directory number. Additionally, existence of a second network address translator within the second domain is determined. If the network address can be determined, a media path is established between the source endpoint and the destination endpoint based on the network address to support the voice call.

22 Claims, 20 Drawing Sheets

U.S. PATENT DOCUMENTS

2006/0182100 A1* 8/2006 Li et al. .................. 370/389

OTHER PUBLICATIONS

"Packet-Based Multimedia Communications Systems", International Telecommunication Union, ITU-T H.323, Jul. 2003.
Falstrom, "E.164 Number and DNS", Internet Engineering Task Force, Request for Comments 2916, Sep. 2000.
Falstrom, "The E.164 to Uniform Resource Identifiers (URI) Dynamic Delegation Discovery System (DDDS) Application (ENUM)", Internet Engineering Task Force, Request for Comments 3761, Apr. 2004.
Levin, "Telephone Number Mapping (ENUM) Service Registration for H.323", Internet Engineering Task Force, Request for Comments 3762, Apr. 2004.
Peterson, "ENUMservice Registration for Session Initiation Protocol (SIP) Addresses-of-Record", Internet Engineering Task Force, Request for Comments 3764, Apr. 2004.
Dierks et al., "The TLS Protocol", Internet Engineering Task Force, Request for Comments 2246, Jan. 1999.
Loughney et al., "Authentication, Authorization, and Accounting Requirements for the Session Initiation Protocol (SIP)", Internet Engineering Task Force, Request for Comments 3702, Feb. 2004.
Rosenberg et al., "SIP: Session Initiation Protocol", Internet Engineering Task Force, Request for Comments 3261, Jun. 2002.
Rigney et al., "Remote Authentication Dial in User Service (RADIUS)", Internet Engineering Task Force, Request for Comments 2865, Jun. 2000.
Rosenburg et al., STUN—Simple Traversal of User Datagram Protocol (UDP) Through Network Address Translators (NATs), Internet Engineering Task Force, Request for Comments 3489, Mar. 2003.
Johnston et al., "Session Initiation Protocol (SIP) Basic Call Flow Examples", Internet Engineering Task Force, Request for Comments 3665, Dec. 2003.
Johnston et al., "Session Initiation Protocol (SIP) Public Switched Telephone Network (PSTN) Call Flows", Internet Engineering Task Force, Request for Comments 3666, Dec. 2003.
Rosenberg, "A Presence Event Package for the Session Initiation Protocol (SIP)", Internet Engineering Task Force, Internet Draft, Jan. 2003.
Khartabil et al., "Functional Description of Event Notification Filtering", Internet Engineering Task Force, Internet Draft, Feb. 3, 2004.
Rosenberg, "A Watcher Information Event Template-Package for the Session Initiation Protocol (SIP)", Internet Engineering Task Force, Internet Draft, Jan. 2003.
Rosenberg, "An Extensible Markup Language (XML) Configuration Access Protocol (XCAP)", Internet Engineering Task Force, Internet Draft, Jul. 2004.
Blake-Wilson et al., "Transport Layer Security (TLS) Extensions", Internet Engineering Task Force, Request for Comments 3546, Jul. 2003.
Schulzrinne, "CIPID: Contact Information in Presence Information Data Format", Internet Engineering Task Force, Internet Draft, Jul. 2004.
Schulzrinne et al., "RPID: Rich Presence Extensions to the Presence Information Data Format (PIDF)", Internet Engineering Task Force, Internet Draft, Mar. 2004.
Schulzrinne, "Timed Presence Extensions to the Presence Information Data Format (PIDF) to Indicate Presence Information for Past and Future Time Intervals", Internet Engineering Task Force, Internet Draft, Jul. 2004.
Rosenberg J et al: "SIP Traversal through Residential and Enterprise NATs and Firewalls" Internet Citation, [Online] XP002245049 Retrieved from the Internet: URL:http://www.watersprings.org/pub/id/draft-davies-fw-nat-traversal-OO.txt> [retrieved on Jun. 20, 2003].
Sanjoy Sen Patrick Sollee Sean March Nortel Networks: "Midcom-unaware NAT/Firewall Traversal <draft-sen-midcom-fw-nat-01.txt>; draft-sen-midcom-fw-nat-01.txt" IETF Standard-Working-Draft, Internet Engineering Task Force, IETF, CH, No. I, Apr. 1, 2002.
Peterson H Liu J Yu Neustar B Campbell Dynamicsoft J: "Using E.164 numbers with the Session Initiation Protocol (SIP); rfc3824.txt" IETF Standard, Internet Engineering Task Force, IETF, CH, Jun. 1, 2004.
Rosenberg J Weinberger Dynamicsoft C Huitema Microsoft Rmahy Cisco J: "STUNSimple Traversal of User Datagram Protocol (UDP) Through Network Address Translators (NATs); rfc3489.txt" IETF Standard, Internet Engineering Task Force, IETF, CH, Mar. 1, 2003.
Rosenberg Dynamicsoft Rmahy Cisco Systems C Huitema Microsoft J: "Traversal Using Relay NAT (TURN); draft-rosenberg-midcom-turn-05.txt" IETF Standard-Working-Draft, Internet Engineering Task Force, IEFT, CH, No. 5, Jul. 19, 2004.

* cited by examiner

METHOD AND SYSTEM FOR PROVIDING INTERDOMAIN TRAVERSAL IN SUPPORT OF PACKETIZED VOICE TRANSMISSIONS

RELATED APPLICATIONS

This application is related to, and claims the benefit of the earlier filing date under 35 U.S.C. § 119(e) of, U.S. Provisional Patent Application (Ser. No. 60/601,256), filed Aug. 13, 2004, entitled "Communications System with SIP-based Fixed-Mobile Convergence," and U.S. Provisional Patent Application (Ser. No. 60/606,605), filed Sep. 2, 2004, entitled "IP Interconnect Architecture"; the entireties of which are incorporated herein by reference.

FIELD OF THE INVENTION

The present invention, according to various embodiments, relates to communications, and more particularly, to transmitting a packetized voice call across different domains.

BACKGROUND OF THE INVENTION

Internet Protocol (IP) telephony has changed the business model and engineering approaches of how voice services are provisioned and delivered. The attractive economics of IP telephony (stemming largely from the global connectivity and accessibility of the Internet) along with innovative productivity tools for users have triggered adoption of this technology by numerous businesses, organizations, enterprises and the like. Unfortunately, this adoption primarily has been uncoordinated, and driven by the needs of the specific enterprise little regard to a "global" approach for IP telephony deployment. Interestingly, the prevailing IP telephony implementations have confined the particular enterprises, as to make communications outside the enterprise difficult and impractical.

As enterprises implement Internet telephony as well as messaging systems and associated applications, closed communities of IP enabled users are created—i.e., "IP islands". That is, because of systems and applications constraints and incompatibilities, these IP enable users are isolated, and thus, cannot readily communicate with each other. Moreover, as Internet Service Providers (ISPs), cable, and mobile network operators begin to provide Internet telephony services. The IP islands grow even larger into a "constellation" of non-connected communities. While such communities can in some cases be linked using the Public Switched Telephone Network (PSTN), the benefits of IP telephony—e.g., user presence, unified communications, user preference, and lower costs may be sacrificed.

Unlike the PSTN in which users and carriers are easily reachable by anyone on the network, IP telephony is subject to several constraints. First, users are required to have knowledge of whether an IP endpoint is available if the full capabilities of IP telephony are to be realized. Also, the knowledge of whether there are multiple IP enabled devices is being used by the called party as well as how to reach such devices is needed. Another constraint is that a single IP "telephone" number is not available among the various IP enabled devices; instead, these devices utilize diverse and complex addresses. Further, determining the identity of the calling party (e.g., caller ID) is an important function.

Based on the foregoing, there is a clear need for an approach that facilitates bridging of the IP islands, thereby enabling greater deployment of IP telephony. There is also a need for a mechanism to ensure compatibility and coordination of IP telephony services among service providers. There is a further need for an approach to exploit the full capabilities of Internet telephony technologies.

SUMMARY OF THE INVENTION

These and other needs are addressed by the present invention, in which an approach for performing network based packetized voice call processing is provided.

According to one aspect of the present invention, a method for providing communication services is disclosed. The method includes receiving a request for establishing a voice call from a source endpoint behind a first network address translator of a first domain, wherein the request specifies a directory number of a destination endpoint within a second domain. The method also includes selectively determining a network address for communicating with the destination endpoint based on the directory number. Additionally, the method includes determining existence of a second network address translator within the second domain. Further, the method includes, if the network address can be determined, establishing a media path between the source endpoint and the destination endpoint based on the network address to support the voice call.

According to another aspect of the present invention, a system for providing managed communication services is disclosed. The system includes a proxy server configured to receive a request for establishing a voice call from a source endpoint behind a first network address translator of a first domain, wherein the request specifies a directory number of a destination endpoint within a second domain. The system also includes an address server configured to selectively determine a network address for communicating with the destination endpoint based on the directory number. Additionally, the system includes a STUN (Simple Traversal of UDP (User Datagram Protocol)) server configured to support determination of existence of a second network address translator within the second domain. The system further includes a TURN (Traversal Using Relay NAT (Network Address Translation)) server configured to establish, if the network address can be determined, a media path between the source endpoint and the destination endpoint based on the network address to support the voice call.

According to another aspect of the present invention, a method of supporting communication with a mobile terminal is disclosed. The method includes receiving a call establishment request from the mobile terminal during a cellular call over a cellular network, wherein the mobile terminal provides a first operational mode for communicating over the cellular network and a second operational mode for communicating over a wireless access network. The method also includes, in response to the call establishment request, initiating teardown of the cellular call and establishment of a voice call over the wireless access network.

According to yet another aspect of the present invention, a system for providing communication services is disclosed. The system includes means for receiving a request for establishing a voice call from a source endpoint behind a first network address translator of a first domain, wherein the request specifies a directory number of a destination endpoint within a second domain. The system also includes means for selectively determining a network address for communicating with the destination endpoint based on the directory number. Further, the system includes means for determining existence of a second network address translator within the second domain; and means for establishing a media path between the source endpoint and the destination endpoint based on the network address to support the voice call, if the network address can be determined.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for providing interdomain traversal to support packetized voice transmissions are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to the Internet Protocol (IP) based voice sessions, it is contemplated that these embodiments have applicability to other communication protocols.

Figure 1:
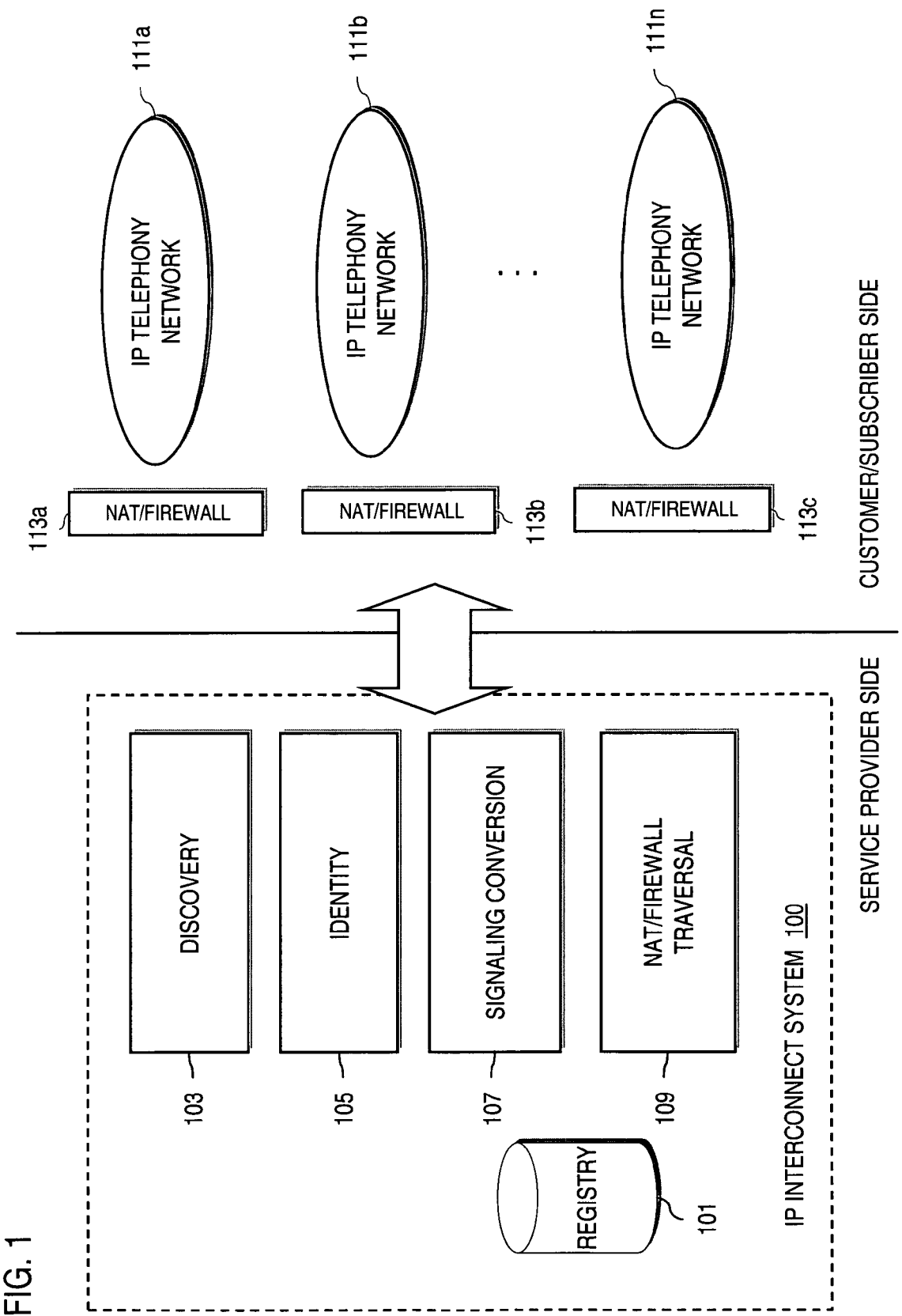
FIG. 1 is a functional diagram of a communication system for supporting interconnectivity of disparate packetized voice networks, according to one embodiment of the present invention.

FIG. 1 is a functional diagram of a communication system for supporting interconnectivity of disparate packetized voice networks, according to one embodiment of the present invention. An IP interconnect system 100 defines an architecture for a "bridging" service (IP interconnect (IP-IC)), for example, to enterprises and service providers for enabling Internet Protocol (IP) telephony communications among these enterprises. The term "IP interconnect" as used herein is a mechanism that facilitates IP calling by discovering IP users within a registry 101 maintained, for example, by a service provider. The registry is used to determine how IP calls are routed over the Internet, or where no Internet or alternate IP paths are available, to the PSTN or mobile phones.

It is recognized that development of new Internet technologies has enabled creation of new communication services. As a result, strictly traditional communication services over the Public Switched Telephone Network (PSTN) are becoming less attractive economically and functionally. Coincident with greater accessibility to the "constellation" of IP endpoints (e.g., VoIP/IM users across enterprise, carrier/ISP and wireless networks), it is recognized that new features for enhancing the IP calling experience can be developed.

The approach, according to an embodiment of the present invention, provides seamless Internet interconnect between enterprise IP islands, and management of the routing and services offered between such islands. Also, the approach supports traffic between IP enabled Private Branch Exchange (PBX) systems and endpoints (e.g., Session Initiation Protocol (SIP) clients) over the global Internet and IP islands of other service providers—e.g., cable operators, Internet Service Providers (ISPs), Virtual VoIP service providers, etc.

The IP interconnect service system 100, according to one embodiment of the present invention, encompasses the following functional components: a discovery component 103, an identity component 105, a signaling conversion component 107, and a Network Address Translation (NAT)/Firewall traversal component 109. As used herein, the terms Network Address Translation or Network Address Translator are used synonymously. These functional components (or modules) 103-109 provide a capability for enabling connectivity for multiple IP telephony networks 111a-111n n behind NAT and/or firewalls 113a-113n. The system 100, thus, provides for interdomain traversal across these NAT and/or firewalls 113a-113n.

Firewalls 113a-113n provide security for interfacing with another network (e.g., an untrusted network). It is noted that a private network (e.g., enterprise) having connectivity to external network, such as public data network (e.g., the Internet), can be subjected to various security risks. Firewalls can be implemented as hardware and/or software to prevent unauthorized access to the private network. Firewalls monitor incoming and outgoing traffic and filters (or blocks) such traffic according to certain rules and policies. A firewall can employ various techniques to filter traffic; e.g., packet (or flow) filtering examines packets to ensure specified requirements are met with respect to the characteristics of the packet (or flow). Hence, the process only allows packets satisfying such requirements to pass. These requirements can be based on network addresses, ports, or whether the traffic is ingress or egress, etc.

Network Address Translation (NAT) performs translation between private network addresses and public network addresses; i.e., providing private address to public address binding. This binding can be static or dynamic. In the context of security and firewalls, NAT can hide a set of host addresses on the private network behind a pool of public addresses. In this manner, external networks cannot "see" internal addresses, and thereby prevent establishment of connections not originating from the private network. The pool can be one or more network addresses, or can be a range of network addresses (e.g., a set of contiguous network addresses). The NAT can also specify a port range to restrict port translation. NAT is further detailed in RFC 3022, which is incorporated herein by reference in its entirety.

As indicated, discovery 103 plays an important part in providing the "bridging" service to IP enabled "islands." The discovery query can be accomplished using a DNS (Domain Name Service) query (ENUM) or via a SIP query (Redirect server). While this discovery mechanism is most useful between islands 111a-111n, for the sake of simplicity, this mechanism can be used for all requests, even those within an island. Once IP-enabled island discovery is complete, identity 105 is the next concern.

A cryptographically secure identity mechanism 105 can prevent, for example, spam problems confronting email systems. In addition, the identity service 105 provides a "Caller ID" service on the Internet.

As regard signaling conversion 107, in some cases, IP-enabled islands 111a-111n are unable to communicate due to different signaling protocols (e.g., Session Initiation Protocol (SIP) vs. H.323) or protocol incompatibilities (e.g., stemming from different versions of SIP). The IP interconnect service provides signaling conversion for all common protocols (e.g., SIP and H.323), versions, and dialects. This service can be provided, via a SIP proxy service.

By way of example, the system 100 utilizes IP telephony signaling that includes, for example, the H.323 protocol and the Session Initiation Protocol (SIP). The H.323 protocol, which is promulgated by the International Telecommunication Union (ITU), specifies a suite of protocols for multimedia communication. SIP is a competing standard that has been developed by the Internet Engineering Task Force (IETF). SIP is a signaling protocol that is based on a client-server model. It should be noted that both the H.323 protocol and SIP are not limited to IP telephony applications, but have applicability to multimedia services in general. In an embodiment of the present invention, SIP is used to create and terminate voice calls over an IP network. However, it is understood that one of ordinary skill in the art would realize that the International Telecommunications Union (ITU) H.323 protocol suite and similar protocols can be utilized in lieu of SIP.

The IP interconnect service enables the creation of innovative IP-based services that add value to the user, beyond Internet calling, by defining powerful call preference capabilities. Within the service, Voice over IP (VoIP), Instant Messaging (IM), conferencing, collaboration, and other IP communication services are supported.

Figure 2:
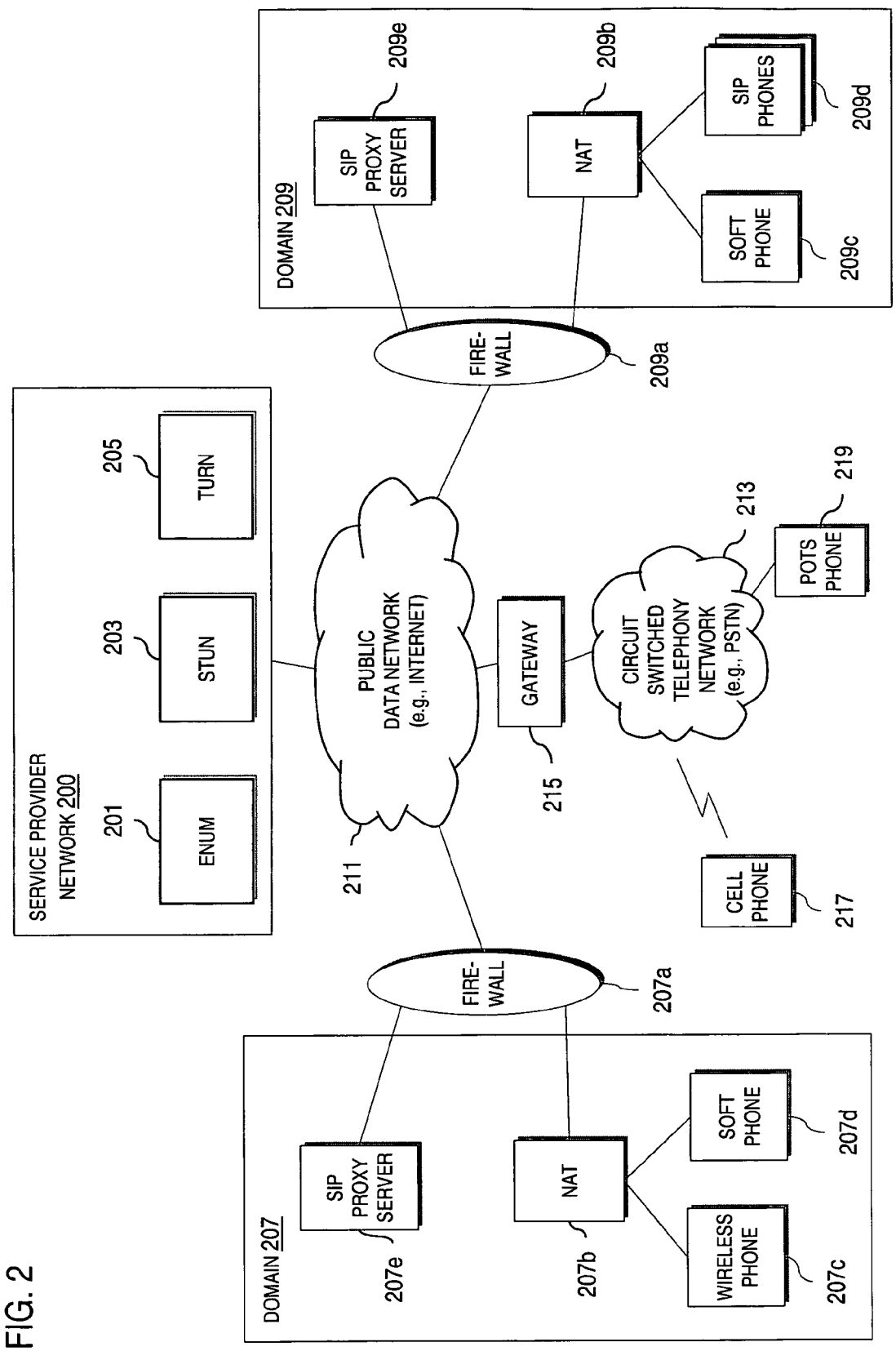
FIG. 2 is a diagram of a communication system capable of providing interdomain traversal, according to one embodiment of the present invention.

FIG. 2 is a diagram of a communication system capable of providing interdomain traversal, according to one embodiment of the present invention. The communication system 200 supplies IP interconnect services, according to the functional architecture of the system of FIG. 1. In an exemplary embodiment, the system 200 provides ENUM service and NAT/Firewall traversal, via an ENUM server 201, a STUN (Simple Traversal of UDP (User Datagram Protocol)) server 203 and a TURN (Traversal Using Relay NAT) server 205. Where NAT and firewall traversal is required, the IP interconnect service provides both endpoint initiated services (e.g., STUN and TURN servers 203, 205) and network initiated services (e.g., ALG (Algorithm) and proxy services).

According to one embodiment of the present invention, the service provider system 200 offers an open managed service for the interdomain traversal. This approach contrasts with the traditional traversal, which is controlled by supernoding (other users) or session border controllers in one domain or the other. Interdomain traversal supports establishing a peer-to-peer communication session between two distinct virtual locations (or domains 207, 209) separated by firewalls 207a, 209a and/or NATs 207b, 209b. Procession of call flows managed service enables the interdomain traversal: ENUM Service. Interdomain traversal involves communicating between a device in one administrative domain 207 and another device in a different administrative domain 209.

In an exemplary embodiment, a SIP proxy server (e.g., servers 207e and 209e) maintains registration for all users in its domain, as well as directory numbers (i.e., telephone numbers) for them. Upon receiving a request for the directory number, if the SIP proxy server determines that number does not correspond to one of registered users, the SIP proxy server queries the ENUM server 201 to obtain the requested number.

In an exemplary embodiment, the system 200 supports customization of components and processes to enable procession of call flows managed service; these components include the client (e.g., 207c and 207d), SIP proxy server 207e, and TURN server 205. The SIP proxy server 207e maintains the user ID's along with their assigned telephone numbers. A registry (not shown) contains identifiers (including aliases) and associated telephone numbers. The SIP proxy server 207e can be configured with routing rules. For example, the SIP proxy server 207e may require looking through the list of registry first before querying the ENUM server 201. If found in the ENUM server 201, the URI corresponding to the telephone number is obtained from the server 201. The URI can be utilized for the INVITE onto the appropriate SIP proxy server (e.g., 209e) for that domain (e.g., 209). The registry of aliases and associated telephone numbers can be maintained locally to minimize querying the ENUM server 201. Essentially, the contact information from the ENUM server 201 is cached for subsequent use, thereby minimizing network traffic and processor loads on the ENUM server 201. With respect to the client 207c, 207d, configuration is made so that the client 207c, 207d knows the location of the TURN server 205. No code modification is required; by default, the client 207c, 207d can be configured to try to communicate with the SIP proxy server 207e or session border controller.

Providing the TURN server 205 as a managed service involves setting up credentials for users. The SIP proxy server 207e can maintain credentials for users and be managed by an enterprise. In managed service network 200 (i.e., "cloud") of the service provider, credential pairs are utilized, as enterprise users may not want SIP User credentials to be managed by the service provider.

The Traversal Using Relay NAT (TURN) protocol permits an element behind a NAT and/or firewall to receive incoming data over Transmission Control Protocol (TCP) or User Datagram Protocol (UDP) connections. That is, the network element within the private network can be on the receiving end, rather than the sending end, of a connection that is requested by the host.

STUN is a lightweight protocol that allows applications to discover the presence and types of Network Address Translators and firewalls between them and the public Internet. This protocol also provides the ability for applications to determine the public IP addresses allocated to them by the NAT. STUN allows a wide variety of applications to work through existing NAT infrastructure.

According to various embodiments of the present invention, the IP interconnect service employs standards-based ENUM and SIP services. The functional structure of the IP interconnect is compatible with, for example, the Internet DNS and infrastructure domain e164.arpa so that future number records migration can be performed seamlessly coincident with public ENUM deployment.

ENUM provides translation of telephone numbers (e.g., E.164) into Uniform Resource Identifiers (URIs), thereby communication with an IP endpoint. It is noted that ENUM is "protocol agnostic" because it is application agnostic, and thus, operates with either H.323 or SIP.

ENUM is a protocol that resolves fully qualified telephone numbers (e.g., E.164) to fully qualified domain name addresses using a Domain Name System (DNS)-based architecture. The protocol, as defined in RFC 2916, uses the DNS for storage of E.164 numbers and supports services associated with an E.164 number. E.164 refers to the international telephone numbering plan administered by the International Telecommunication Union (ITU). E.164 specifies the format, structure, and administrative hierarchy of telephone numbers. A fully qualified E.164 number is designated by a country code, an area or city code, and a phone number.

The translation of a telephone number into an Internet address proceeds as follows. A fully qualified number has the form: "+1-234-567-8910." First, non-numerical characters are removed: 12345678910. Next, the order of these digits are reversed: 01987654321. Thereafter, decimal points are introduced between the digits, resulting in "0.1.9.8.7.6.5.4.3.2.1," and the domain "e164.arpa" is appended. This yields "0.1.9.8.7.6.5.4.3.2.1.e164.arpa." The .arpa domain has been designated for Internet infrastructure purposes. Based on this address, the ENUM protocol issues a DNS query, and retrieves the appropriate NAPTR (Naming Authority Pointer) Resource records, which contain information about what resources, services, and applications are associated with a specific phone number. These services are determined by the subscriber.

By way of example, the system 200 ensures communication between different IP telephony networks, which reside in different administrative domains 207 and 209, over a public data network 211, such as the global Internet. The network within domain 207 includes a firewall 207a for interfacing the public data network 211. Behind the firewall 207a is a NAT 207b that serves a variety of endpoints capable of supporting IP telephony—e.g., a web phone 207c, and a so-called "soft" phone 207d. The network also utilizes a proxy server 207e for supporting packetized voice calls, which in this example is compatible with SIP.

As regard the network 209, a firewall 209a resides between the network 209 and the pubic data network 211. A NAT 209b serves a soft phone 209c and one or more SIP phones 209d. The network 209e also includes a SIP proxy server 290e.

As shown, the Internet 211 communicates with a circuit switched telephone network 213, such as the PSTN, through a gateway 215. Under this scenario, the PSTN 213 supports cellular capable devices 217 (e.g., cellular phones) as well as POTS (Plain Old Telephone Service) phones 219.

Figure 3:
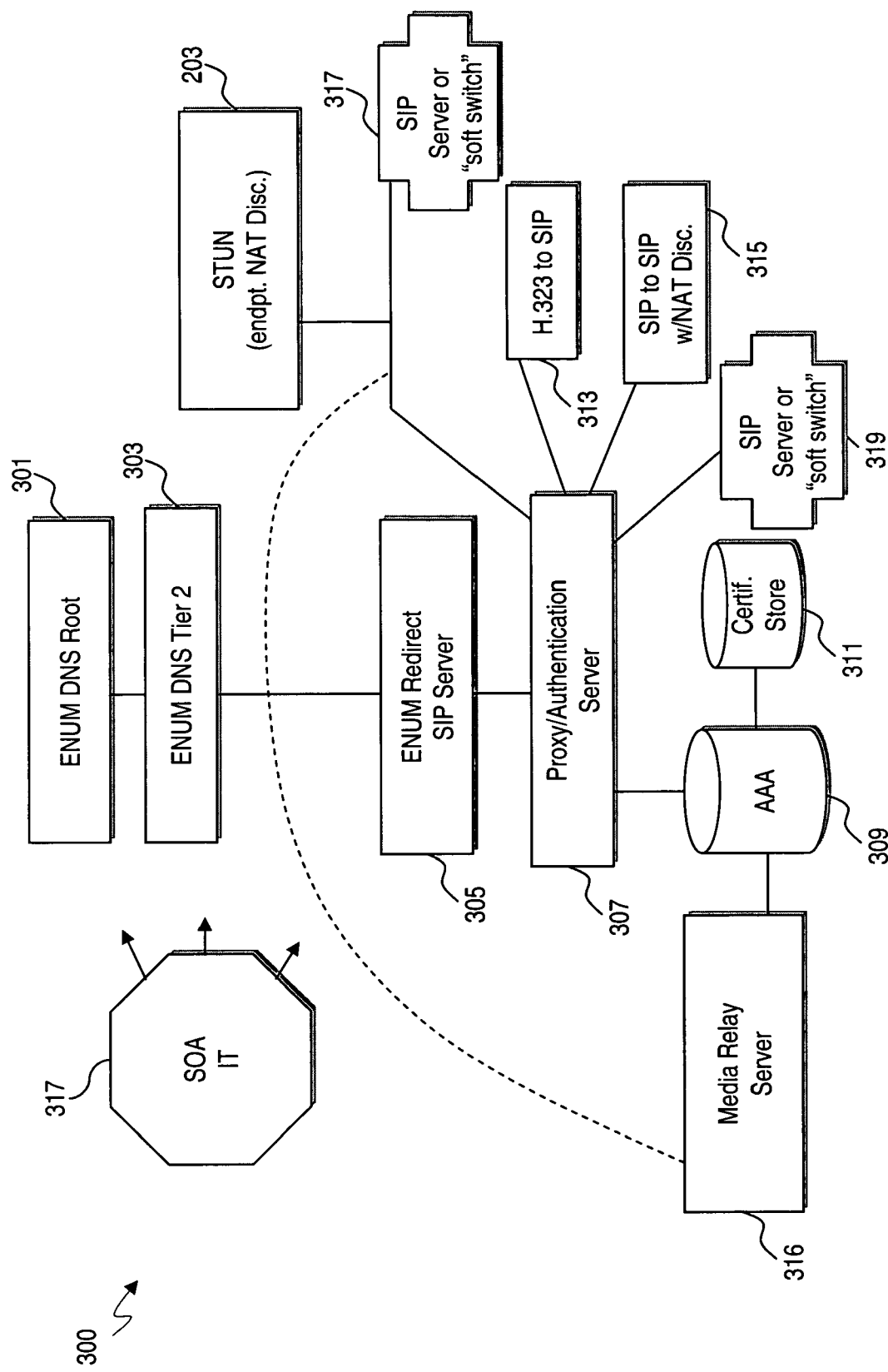
FIG. 3 is a diagram of an exemplary architecture for supporting ENUM (Electronic Number) services in the system of FIG. 1, according to one embodiment of the present invention.

FIG. 3 is a diagram of an exemplary architecture for supporting ENUM services in the system of FIG. 1, according to one embodiment of the present invention. In one scenario, the system 200 of FIG. 2 includes an ENUM system 300 employing various ENUM components, such as an ENUM DNS Root server 301, an ENUM DNS Tier 2 server 303, and ENUM Redirect server 305. The system 300 also includes a Proxy/Authentication server 307, an AAA server 309, a Certificate Store/Authority component 311, and Signaling Conversion gateways 313 and 315 (i.e., H.323-to-SIP Gateway 313 and SIP-to-SIP gateway 315). Additionally, a SIP Network-based NAT Traversal is provided. Further, the system 300 utilizes the STUN server 203, a Media Relay server 316, and a Service Oriented Architecture Information Technology (SOA IT) 317.

The Media Relay Server 316 and two user agents (UAs) in either domain pass each other information about their environment. Such information can include external firewalls, internal IP addresses, and support information.

The ENUM DNS Root server 301 provides a combined Tier 0/Tier 1 ENUM root functionality. Because country codes may not be generally available, the service provider can host its own ENUM tree; this can be structured in a similar way to the e164.arpa tree. According to one embodiment of the present invention, this root server 301 supplies DDOS (Distributed Denial of Service) protection. According to an embodiment of the present invention, the ENUM DNS Root server provides ENUM services according to RFC 3761 and RFC 2916, which are both incorporated herein by reference in their entireties.

The ENUM DNS Tier 2 server 303 is the DNS functionality that contains actual DNS NAPTR records—e.g., one per telephone number. It is noted that only E.164 (global) telephone numbers are used—no private numbers. These records are created and backed up by an administrative system that will tie into the order entry and billing systems (as later described with respect to FIG. 17). It is assumed that entries are authorized and validated using various mechanisms, which can include known authorization and validation standards. The NAPTR records can be queried by any IP-enabled endpoint or island on the Internet, regardless of whether they are an IP interconnect customer or not. In this way, the discovery service mimics that of the public ENUM.

The ENUM DNS Tier 2 server 303, in an exemplary embodiment, utilizes existing DNS server farms to implement the ENUM Tier 2 functionality. A provisioning system (such as that of FIG. 17) can collect the telephone number to URI mapping information from the IP interconnect customers and automatically generate the NAPTR records. As Public ENUM is deployed, the service provider can become a Tier 2 provider in each country code. The provisioning interface can then be adapted to interface with each Tier 1 function. According to an embodiment of the present invention, the ENUM DNS Tier 2 server provides ENUM services according to RFC 3761 as well as RFCs 3762 and 3764 (which are incorporated herein by reference in their entireties).

The ENUM SIP redirect server 305 behaves as a SIP redirect server by accepting SIP requests and responding with a 3xx class response, for example. According one embodiment of the present invention, this redirect server 305 has a built-in ENUM resolver, and queries the ENUM Tier 2 Server using DNS. That is, the server 305 can perform ENUM queries for IP-enabled endpoints or islands that do not have an ENUM resolver; the resolver takes a telephone number, performs a DNS query, and returns a set of Uniform Resource Identifiers (URIs). For instance, the ENUM Redirect server 305 accepts a SIP request (such as INVITE, SUBSCRIBE, or even other methods such as OPTIONS), performs an ENUM query on the telephone number in the Request-URI, and returns a redirect response (302 Moved Temporarily or 300 Multiple Choices) containing Contact header fields with each resolved URI.

For the purposes of explanation, the Request-URI can be a tel URI (tel:+13145551234) or a SIP URI with a telephone number in the user part (sip:+458320923@mci.com; user=phone). The telephone number, in an exemplary embodiment, is in E.164 (global) format. If an endpoint is not able to generate requests in this format, the SIP-to-SIP Gateway service can be used to generate this format. The time-to-live (TTL) information in the ENUM record are translated into an expires parameter for each URI. It is noted that non-SIP URIs may be returned. The resulting set of URIs are mapped into SIP Contact header fields and returned.

If a single URI is returned, it can be done so in a 302 Moved Temporarily response. If multiple URIs are to be returned, a 300 Multiple Choices response is returned. Other SIP elements such as the Proxy/Authentication Server 307, H.323-to-SIP Gateway 313, and SIP-to-SIP Gateway 315 all interact with the ENUM Redirect server 305 using standard SIP messages. It is noted that the ENUM Redirect server 305 does not perform any resolution on the URIs from the ENUM query— they are passed unchanged in the redirect response. If the ENUM query fails to return any URIs, the ENUM Redirect server 305 returns a single tel URI representing the telephone number in the Request-URI. If the Request-URI does not contain a valid E.164 telephone number, the server returns a 404 Not Found response.

The Proxy/Authentication Server 307 is the SIP edge of the IP interconnect service. The Proxy/Authentication Server 307 has two key functions, authentication and proxying requests. The authentication function can be provided on behalf of other elements in the architecture, such as the ENUM Redirect server 305.

The authentication method is determined by the type of security on the link from the service provider to IP interconnect. If the SIP request arrives over a Transport Layer Security (TLS) connection, the certificate provided may be use for authentication. The certificate may be one issued by the Certificate Authority (CA)/Store or it may be one issued by another CA. If the SIP request comes in over a Virtual Private Network (VPN) or IPSec (IP Security), then the use of the private key provides authentication. Otherwise, the request receives a SIP Digest challenge in the form of a 407 Proxy Authentication Required response containing a one time nonce.

The Transport Layer Security (TLS) Protocol provides privacy and data integrity between two applications, and has two layers: the TLS Record Protocol and the TLS Handshake Protocol. The TLS Record Protocol resides on top of a reliable transport protocol, such as TCP. The TLS Record Protocol provides connection security. Symmetric cryptography is used for data encryption (DES, RC4, etc.); the keys are generated uniquely for each connection and are based on a secret negotiated by another protocol (such as the TLS Handshake Protocol). The Record Protocol can also be used without encryption. The message transport includes a message integrity check using a keyed Medium Access Control (MAC), wherein secure hash functions (e.g., SHA, MD5, etc.) are used for MAC computations. The TLS Record Protocol provides encapsulation of various higher level protocols, such as the TLS Handshake Protocol. The TLS Handshake Protocol allows the server and client to authenticate each other and to negotiate an encryption algorithm and cryptographic keys before the application protocol transmits or receives its first byte of data.

The TLS protocol is detailed in RFCs 2246 and 3546 (which are incorporated herein by reference in their entireties); this security protocol is formerly known as the Secure Sockets Layer (SSL).

The Proxy/Authentication Server 307 compares the re-sent request with the MD5 hash of the shared secret to the shared secret retrieved from the AAA server 309. A match provides authentication. An authorization failure will result in a 403 Forbidden response being sent.

Once authentication has succeeded, the Proxy/Authentication Server 307 can provide identity services (as described in FIG. 1). Before any identity services are performed, the From header URI is compared to a list of valid identities for the authenticated party. It is noted that this scope will typically be restricted to the domains of record (host part, not user part) and telephone numbers in tel URIs. If the From identity is valid, identity services may be performed. If it is not valid, a 403 Invalid From Identity response is returned and no further services are rendered.

It is noted that the presence of a Privacy header field in the request may override the normal identity assertion rules. However, the IP interconnect service does not provide complete IP privacy by itself, although using TURN it may be possible for an endpoint to establish a truly private IP session.

According to one embodiment of the present invention, the following identity options are provided: Authenticated Identity Body (AIB), P-Asserted-Identity, and Identity. The particular method that is requested is based on the authenticated user's service profile. In addition, a user's profile will indicate the default server option to proxy or redirect. Alternatively, SIP caller preferences can be used to indicate which mode of operation is desired on a request by request basis.

For the AIB method, the Proxy/Authentication Server 307 generates an Authenticated Identity Body (AIB) and returns it in a 302 Moved Temporarily response. The AIB is signed by the Proxy/Authentication Server 307 using the IP interconnect private key. The resulting request is then retried by the user with the AIB included as a message body. The AIB method is used in a redirect mode.

For the P-Asserted-Identity method, the Proxy/Authentication Server 307 generates the P-Asserted-Identity header field, possibly using the P-Preferred-Identity header field if multiple identities are valid. The P-Asserted-Identity method is used in proxy mode. An additional requirement on P-Asserted-Identity is the use of an integrity protected SIP connection from the Proxy/Authentication Server 307 and the next hop (effectively this means TLS transport or the use of VPN or IPSec tunnel). If integrity protection is not available, no P-Asserted-Identity service can be provided.

For the Identity method, the Proxy/Authentication Server 307 generates an Identity header field and either returns it in a redirect or proxies the request. The Identity method can be used in either proxy or redirect mode. In proxy mode, the Proxy/Authentication Server 307 performs DNS resolution on the Request-URI according to normal SIP DNS rules and prepares to proxy the request.

The Proxy/Authentication Server 307 has SIP interfaces to the ENUM Redirect server 305, the H.323-to-SIP gateway 313, and the SIP-to-SIP gateway 315. Authentication can be performed, according to an exemplary embodiment, using normal SIP mechanisms, such as SIP Digest challenge, certificate validation, or symmetric key encryption (e.g., IPSec or VPN). Credentials are verified in a AAA database using the RADIUS protocol.

Additionally, the Proxy/Authentication Server 307 can serve as one or more SIP servers 317 and 319 (or "soft switches").

The Authentication, Authorization, and Accounting (AAA) Server 309 provides various service specific information such as credentials, preferences, and service options. The AAA server 309 stores the shared secrets (usernames/passwords) of IP interconnect customers. This server 309 is accessed by other elements using RADIUS—e.g., the Proxy/Authentication Server 307, SIP to H.323 Gateway, SIP-to-SIP gateway 315, and TURN Servers. SIP AAA functions are further detailed in RFC 3702, which is incorporated herein by reference in its entirety.

The Certificate Store/Authority server 311 hosts and allocates certificates to IP-enabled endpoints or islands. The certificates can be stored locally on the respective islands or can be stored in the network. The Certificate Authority (CA) Store 311 provides certificate creation, management, revocation, storage and distribution. The certificates can be either self-signed certificates (suitable for individual SIP endpoints to use for Secure/Multipurpose Internet Mail Extensions (S/MIME) or SRTP (Secure Real-time Transport Protocol)) or certificates issued by the IP interconnect CA. By way of example, the certificates can be fetched using TLS, SIP and HyperText Transfer Protocol (HTTP)-based mechanisms. The Certificate Authority functionality provides limited SIP identity assertions, and thus, provides a more cost-effective approach than conventional Verisign-type e-commerce certificates.

In addition, the Proxy/Authentication Server 307 uses the Certificate Authority/Store to retrieve and verify certificates of customers.

The H.323-to-SIP gateway 313, in this example, provides conversion between H.323 and SIP. According to one embodiment of the present invention, This gateway 313 can serve an IP PBX 321. To the SIP network, the gateway 313 appears as a SIP User Agent, while appearing as a H.323 Gatekeeper to a H.323 network. Normal H.323 authentication mechanisms can be used.

Under the scenario of FIG. 3, a SIP-to-SIP gateway 315 for converting incompatible SIP dialects to, for example, the standard RFC 3261 SIP. Some typical "broken" SIP issues include incorrect use of To/From tags, malformed header fields and bodies, nonstandard methods, nonstandard DTMF transport methods, multipart Multipurpose Internet Mail Extensions (MIME) handling issues (e.g., SIP-T (Session Initiation Protocol for Telephones)), proprietary authentication schemes, transport protocol incompatibilities, improper Record-Route and proxy routing behavior, and IPv6 to IPv4 mapping.

The SIP-to-SIP gateway 315 acts as transparently as possible, when serving IP PBX 323, for example. The SIP-to-SIP gateway 315 also provides the authentication function, and support some additional authentication schemes. According to an embodiment of the present invention, credentials are verified in a AAA database using the RADIUS protocol. This protocol can be embedded in various network elements: routers, modem servers, switches, etc. RADIUS facilitates centralized user administration, which is important in large networks having significant number of users. Additionally, these users are continually being added and deleted (resulting in constant flux of authentication information). RADIUS is described in Internet Engineering Task Force (IETF) Request For Comment (RFC) 2865 entitled "Remote Authentication Dial In User Service (RADIUS)" (June 2000), which is incorporated herein by reference in its entirety.

The SIP Network-based NAT Traversal function performs the necessary signaling to support network based NAT traversal by invoking a media relay function (e.g., TURN or RTP proxy) for sessions that would otherwise fail. According to an embodiment of the present invention, only islands provisioned for this service can utilize this function. Network-based NAT traversal is provided when the island does not manage this function internally. When a media relay is required, the SIP-to-SIP gateway 315 invokes one from the Media Relay function, and modify the SIP signaling messages appropriately. In addition to TURN, other protocols can be used between the SIP-to-SIP gateway 315 and the Media Relay 316.

It is noted that this SIP Network-based NAT Traversal function is transparent to islands using STUN and TURN—this appears as if no NAT is present, and hence no action is taken. The NAT traversal functionality can be provisioned for a given island rather than dynamically detected. This is because the dynamic detection of NATs requires registration data which is generally not available from islands.

The Simple Traversal of UDP through NAT (STUN) Server 203 provides endpoint-based NAT discovery and characterization. A STUN-enabled endpoint can traverse most NAT types without relying on network-based detection and fixing. An endpoint can determine the type of NAT (e.g., full cone, restricted cone, or symmetric) and discover and maintain bindings between private and public IP addresses. For an endpoint, the combination of STUN and TURN usage, as described in the ICE (Interactivity Communication Establishment) protocol, provides complete endpoint-based NAT traversal.

It is noted that the STUN server 203 does not authenticate users, largely because the resources used are trivial as it is essentially just a type of "ping" server. As a result, no AAA or provisioning tie in is necessary. STUN server discovery can be provided using DNS SRV lookups on the domain used by the IP interconnect service. The STUN functions are further detailed in RFC 3489, which is incorporated herein by reference in its entirety.

The Media Relay function provides the relay functionality needed in certain NAT and firewall traversal scenarios. This function is provided using both TURN (Traversal Using Relay NAT) Server 205 (for endpoint-enabled traversal) and RTP proxies (for network-based relay). Authentication is performed using SIP Digest credentials and accessed using RADIUS from the AAA server 309. In an exemplary embodiment, the Media Relay function provides RTP and Real-Time Control Protocol (RTCP) relay functionality for NAT and firewall traversal.

According to one embodiment of the present invention, the Media Relay function is decentralized and distributed throughout the service provider's IP backbone. In addition, some optimal Media Relay selection algorithms can be used. In the alternative, centrally deployed media relays can be utilized if a distributed architecture cannot be achieved. The architecture supports both network invoked and endpoint invoked media relay functionality. As such, a standards-based protocol, such as TURN, is used. Media Relays are a significant network resource; as such, they must authenticate and account for usage. Because the TURN function supports reuse of existing SIP Digest credentials, the TURN servers are able to access the AAA Servers (e.g., server 309).

The SOA IT Server 317 provides the "back office" functions necessary to provide the Interconnect service. That is, the SOA IT has components that provide the Operational Support System (OSS) functions needed to run and support the IP interconnect product offering as a revenue-generating business. According to one embodiment of the present invention, the SOA IT components include both customer-facing systems (e.g., enabling customer self-service), and back-office systems. The SOA IT components largely concentrate on the so-called F-A-B broad functional areas: Fulfillment, Assurance and Billing—as well as ensuring that such functions are compliant with regulatory reporting requirements. Such functions are more fully described with respect to FIG. 17.

The described IP interconnect services involve the interaction of SIP, STUN and TURN protocols to support IP telephony. This interaction is explained in the call flows of FIGS. 4 and 5, in the context of FIG. 2.

Figure 4:
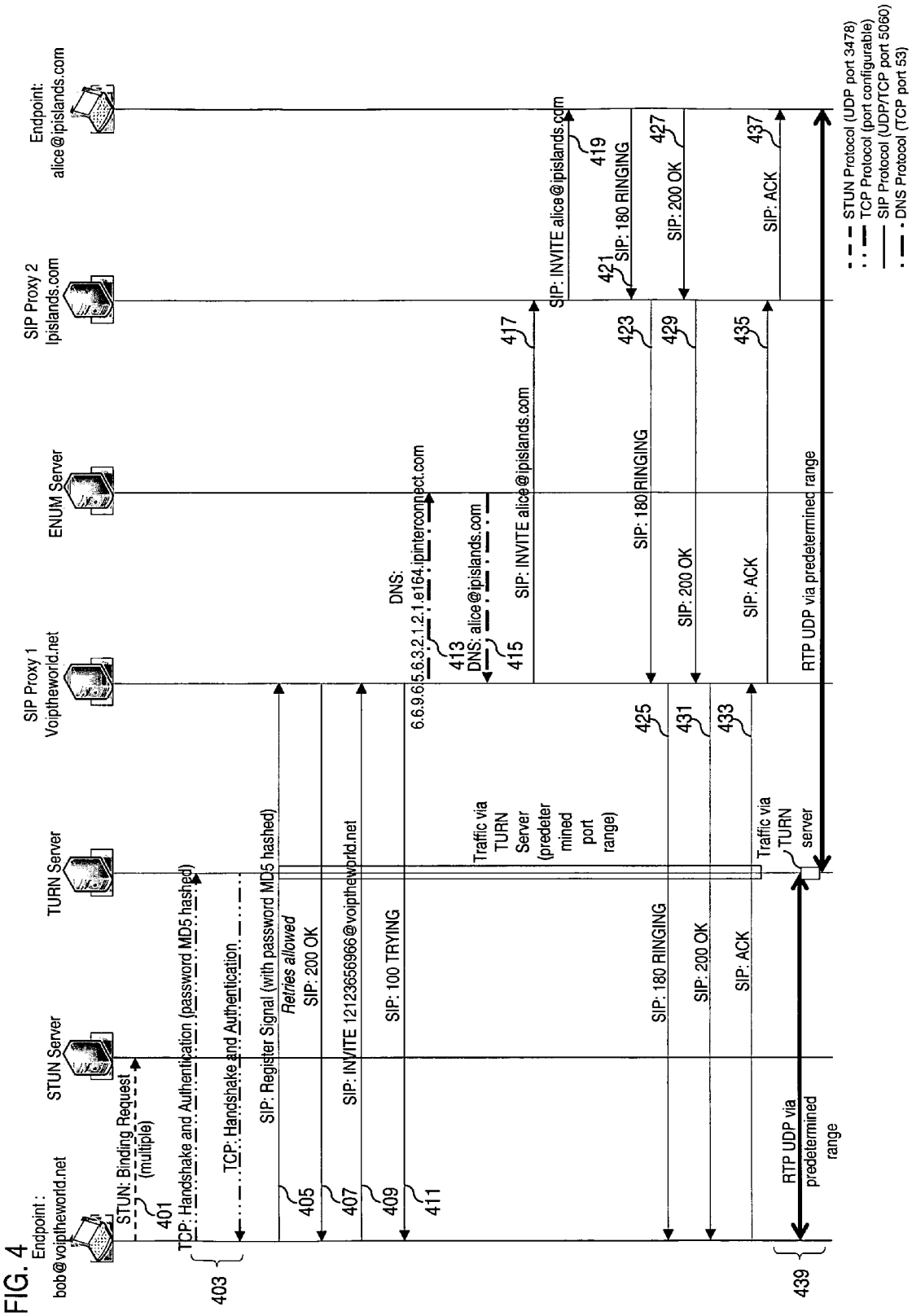
FIG. 4 is a diagram of an exemplary Session Initiation Protocol (SIP)-to-SIP call flow, according to an embodiment of the present invention.

FIG. 4 is a diagram of an exemplary Session Initiation Protocol (SIP)-to-SIP call flow, according to an embodiment of the present invention. For the purposes of illustration, the source (or originating) endpoint is the soft phone 207d and has an identifier, bob@voiptheworld.net. The destination (or terminating) endpoint is the soft phone 209c with user, alice@ipislands.com. In step 401, the endpoint 207d establishes communication with the STUN server 203 by issuing a binding request. This communication is established using a standard TCP handshake and authentication process (step 403). Next, the endpoint 207d sends a register signal, e.g., using SIP (REGISTER/200 OK), to the SIP proxy server 207e using a connection through the TURN server 205 (step 405). The SIP proxy server 207e responds, as in step 407, with a 200 OK message to the endpoint 207d.

In step 409, the endpoint 207d submits an INVITE message to the SIP proxy server 207e, which replies with a 100 Trying message (step 411).

At this point, the proxy server 207e determines that the URI of the destination endpoint 209d needs to be determined. Accordingly, the SIP proxy server 207e submits a DNS query to the ENUM server 201, which responds with the appropriate NAPTR record (steps 413 and 415).

Next, the SIP proxy server 207e sends the INVITE message to the SIP proxy server 209e of the destination network (step 417). The SIP proxy server 209e forwards the INVITE message to the destination endpoint 209d, per step 419.

The endpoint 209d then sends a 180 Ringing message, as in step 421, to the SIP proxy server 209e, which relays the message to the SIP proxy server 207e (step 423). Thereafter, the Ringing message is transmitted, per step 425, to the source endpoint 207d.

In step 427, the endpoint 209d generates a 200 OK message, forwarding the message to the SIP proxy server 209e. In step 429, this 200 OK message is relayed by the SIP proxy server 209e to the other SIP proxy server 207e. Thereafter, the 200 OK message is forwarded by the SIP proxy server 207e to the source endpoint 207d, as in step 431. The endpoint 207d acknowledges the SIP proxy server 207e with an ACK message (step 431). The SIP proxy server 207e sends the ACK message to the destination endpoint 209d through the SIP proxy server 209e (steps 435 and 437). In step 439, the endpoints 207d and 209d now can exchange media via the TURN server 205.

Figure 5:
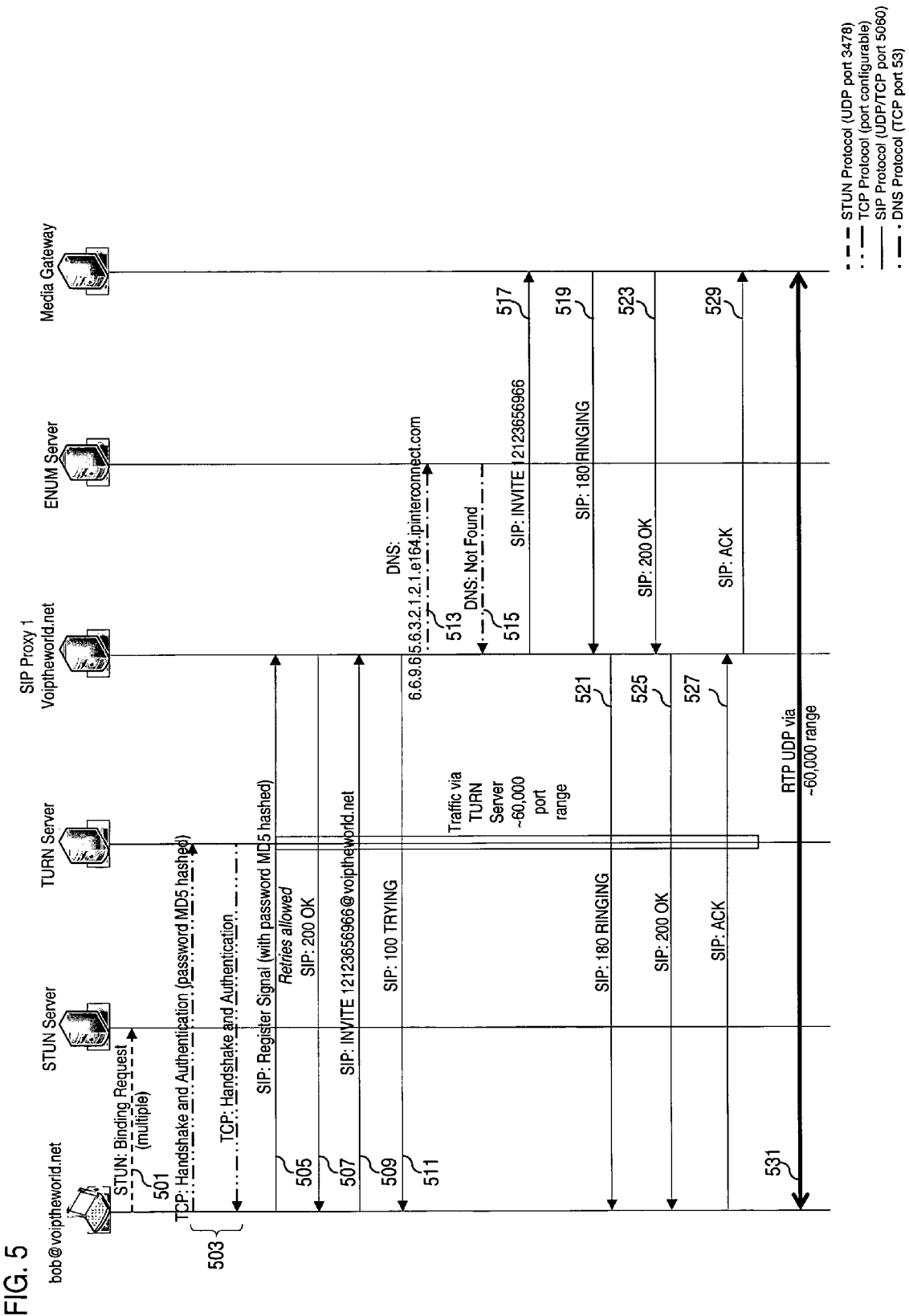
FIG. 5 is a diagram of an exemplary SIP-to-PSTN (Public Switched Telephone Network) call flow, according to an embodiment of the present invention.

FIG. 5 is a diagram of an exemplary SIP-to-PSTN (Public Switched Telephone Network) call flow, according to an embodiment of the present invention. Under this scenario as with the SIP-to-SIP call flow, communication is performed via the TURN server 205. The endpoint 207d establishes communication with the STUN server 203 with a binding request, per step 501. A standard TCP handshake and authentication process is executed, per step 503, between the endpoint 207d and the STUN server 203. The endpoint 207d transmits a register signal to the SIP proxy server 207e (step 505). The SIP proxy server 207e sends a 200 OK message to the endpoint 207d in response to the Register signal, per step 507.

In step 509, the endpoint 207d sends an INVITE message to the SIP proxy server 207e. The server 207e then replies with a 100 Trying message (step 511).

Per step 513, the proxy server 207e sends a DNS query to the ENUM server 201. In this example, the ENUM server 201 cannot find the corresponding URI, and indicates so to the SIP proxy server 207e, per step 515. Accordingly, the SIP proxy server 207e sends an INVITE message to the media gateway 215 (step 517); the INVITE message specifies the telephone number. The media gateway 215, as in step 519, replies with a 180 Ringing message. The SIP proxy server 207e forwards the 180 Ringing message to the endpoint 207d, per step 521.

In step 523, the media gateway 215 also sends a 200 OK message to the SIP proxy server 207e. This message is then forwarded to the endpoint 207d (step 525) by the SIP proxy server 207e.

The endpoint 207d responds with an ACK message to the SIP proxy server 207e, which sends the message to the media gateway 215 (steps 527 and 529). In step 531, a call is established between the source endpoint 207d and the PSTN via the media gateway 215.

Figure 6:
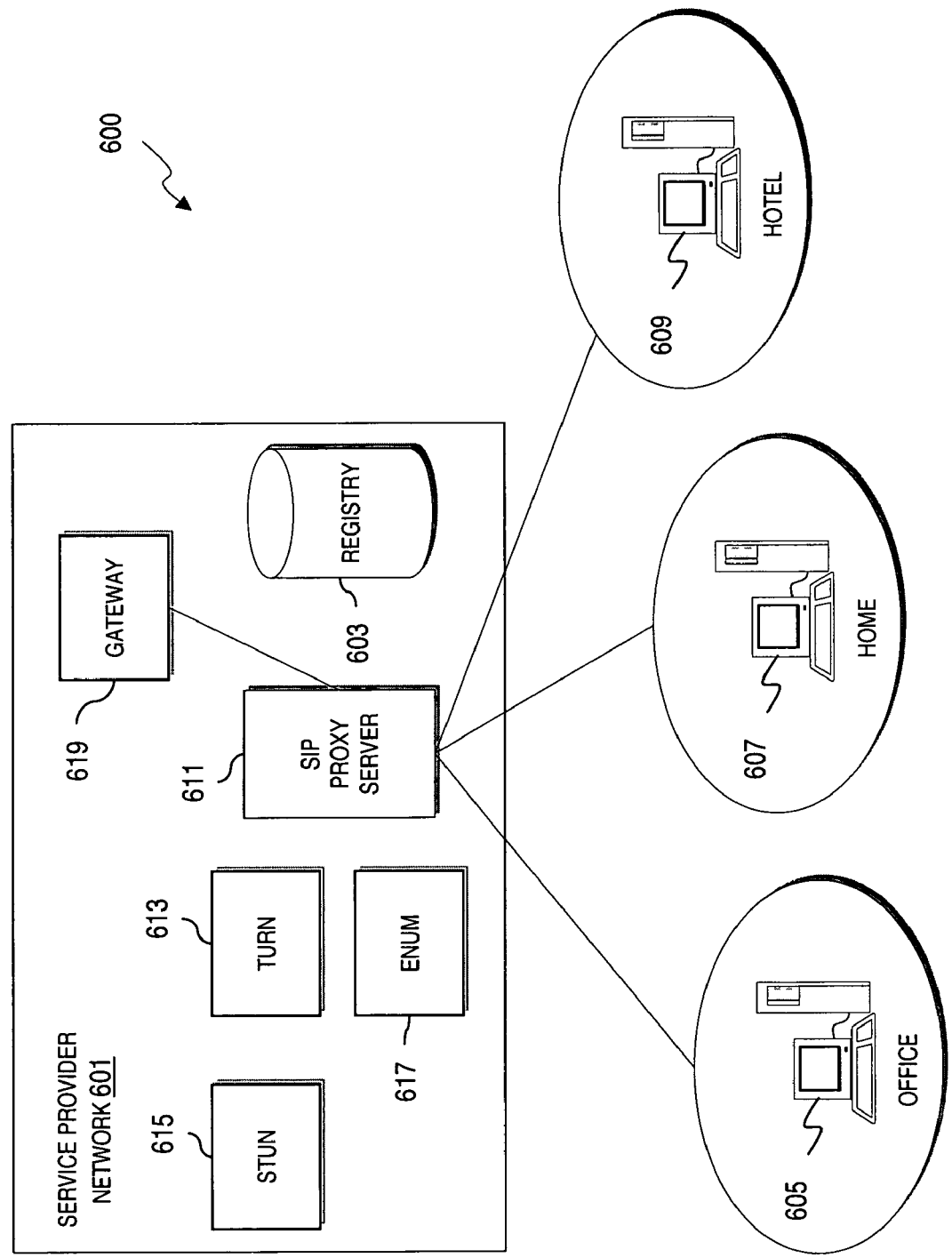
FIG. 6 is a diagram of an architecture utilizing a centralized data store supporting communication among remote endpoints, according to an embodiment of the present invention.

FIG. 6 is a diagram of an architecture utilizing a centralized data store supporting communication among remote endpoints, according to an embodiment of the present invention. A communication system 600 includes a service provider network 601 deploying components to support the Interconnect services, as described above. Notably, the network 601 utilizes a data store 603 (or registry) to manage communication among the endpoints 605, 607 and 609. These endpoints 605, 607 and 609, for example, can be associated with a single enterprise, organization or entity, in which the endpoint 605 can correspond to an office location, the endpoint 607 with the home, and the endpoint 609 with a temporary, mobile location such as a hotel.

The data store 603 stores user information as well as information on how packetized voice calls are to be routed over a public data network such as the Internet; further, this registry 603 can specify alternate paths, including circuit-switched paths, cellular paths, or IP media paths; such routing information can take many forms, including network addresses, protocol port information, etc. Additionally, the data store 603 permits the service provider to store and manage billing and rating information for calls placed by users. Further, the service provider can maintain the necessary information to authorize communication between the end points involving different network elements.

The network 601 includes a SIP proxy server 611 for interfacing the various endpoints 605, 607 and 609. The SIP proxy server 611 interacts with a TURN server 613, a STUN server 615 and an ENUM server 617 as detailed early for supporting packetized voice calls with other data networks as well as circuit-switched telephone systems.

In addition, the system 601 utilizes a gateway 619 to provide connectivity to other systems (e.g., data network or circuit switched telephone network).

It is contemplated that the above architecture can be deployed in a variety of terrestrial and radio communication systems to offer the Interconnect services, which can be complementary or supplementary to other communication services. For example, a wireless communication system can implement such services, as explained below.

Figure 7:
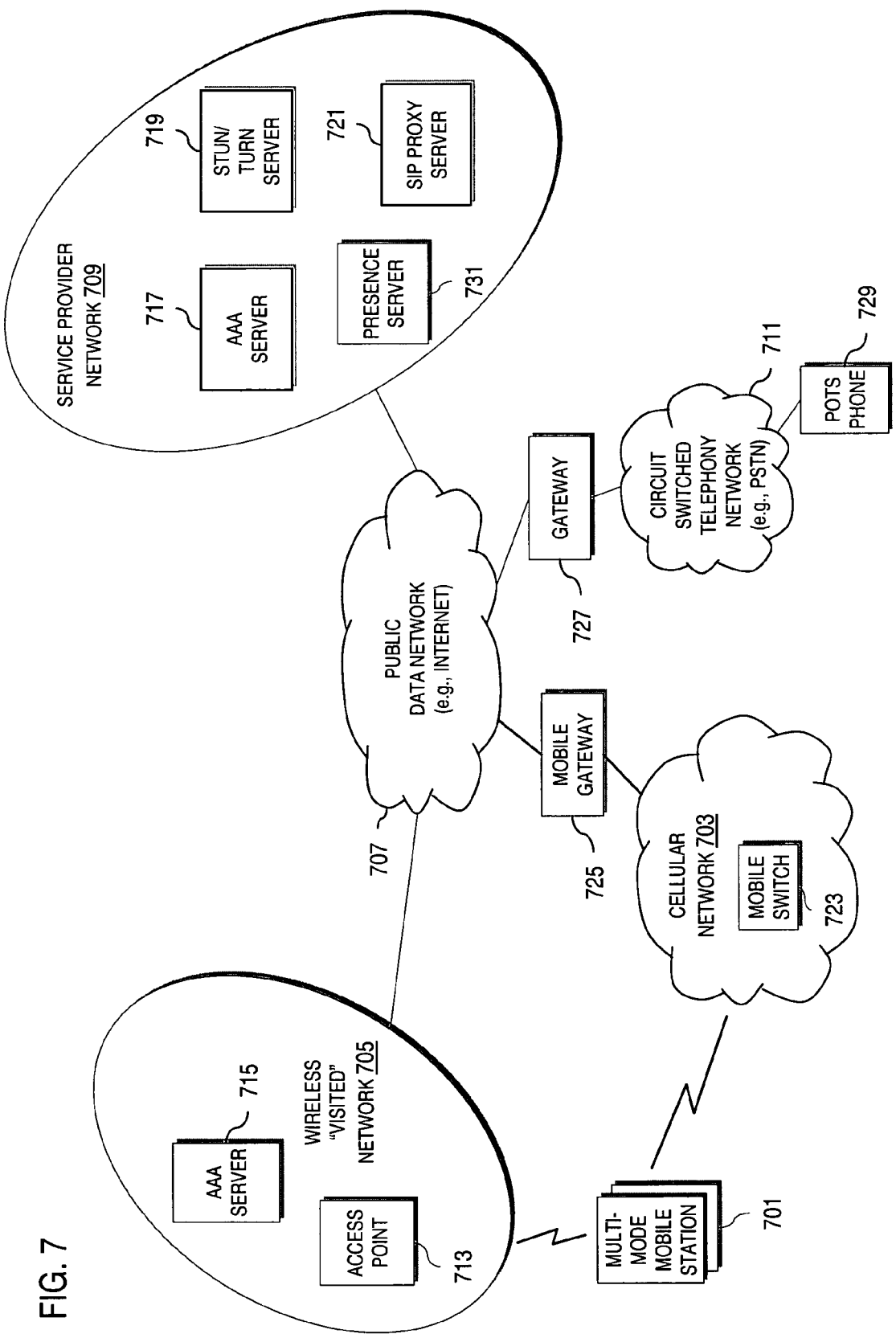
FIG. 7 is a diagram of a wireless communication system for providing application mobility, according to one embodiment of the present invention.

FIG. 7 is a diagram of a wireless communication system for providing application mobility, according to one embodiment of the present invention. In accordance with an embodiment of the present invention, the Interconnect services can be deployed in a wireless and wired system 700 for providing SIP-based mobile IP communication services. As shown, one or more multimodal mobile devices 701 can communicate using various wireless technologies—e.g., Wi-Fi™/WiMax, 802.11 or cellular. Under this scenario, the multimodal device 701 can interface with either a mobile telephony (e.g., cellular) network 703 or a wireless data network 705. Each of these networks 703 and 705 communicates with a public data network 707, such as the Internet. A service provider network 709 also has connectivity to the Internet 707, which communicates with a Public Switched Telephone Network (PSTN) 711.

The approach, in an exemplary embodiment, adheres to the following assumptions. First, the IP side controls all fixed and mobile services. Also, it is assumed that calls are established over a myriad of networks: the Internet 707, 2G/3G mobile networks (3GPP and 3GPP2) 703, Time Division Multiplexing (TDM) networks 714, such as the PSTN and PBXs and ISDN (Integrated Digital Services Network), 4G (4$^{th}$ Generation) Wi-Fi™ and WiMax wireless networks, and IP PBXs and other IP systems, such as H.323. Communication services are enabled or deployed on the IP side and can be based, for instance, on SIP and its associated application layer protocols, such as developed in the SIMPLE, SIPPING, IPTEL, XCON and ENUM working groups of the Internet Engineering Task Force (IETF). The system 700, for example, includes SIP telephony and IM devices that are endpoints on the Internet 707. Gateways to 2G/3G mobile phone networks are also endpoints on the Internet 707. Further, SIP-PSTN and SIP-PBX are endpoints on the Internet 707. The above approach is compatible with the end-to-end applications control architecture of the Internet 707—e.g., IETF documents RFC 3665 and RFC 3666 show exemplary SIP call flow implementations for PBX/Centrex-like telephony and SIP-PSTN, respectively; these documents are incorporated herein by reference in their entireties.

The wireless network 705 (which is a "Visited" network with respect to the service provider network 709) includes an access point 713 (e.g., Ethernet switch) as well as an AAA server 715. Likewise, the service provider network 709 includes an AAA server 717. In addition, the network 709 provides a STUN/TURN server 719; these two functions can also be implemented as separate components, as evident from the previous discussion of STUN and TURN functionalities. Further, the service provider network 709 includes a SIP proxy server 721.

The mobile telephony network (e.g., cellular network) 703 includes a mobile switch 723 for processing communication sessions from the multimodal mobile station 701 to the PSTN 711 or the Internet 707 through a mobile gateway 725. Similarly, a gateway 727 is employed to connect from the PSTN 711 to the Internet 707; in this manner, the station 729 within the PSTN 711 can be reached by calls placed over the Internet 707.

Depending on the capabilities supported by the wireless or wired access network, rich services, such as presence, events, instant messaging, voice telephony, video, games and entertainment services can be supported by the service provider network 709.

It is recognized that modern communication technologies have afforded users with a multitude of alternatives for communicating. Given these many possibilities, a user is unsure, at times, of the most appropriate, expedient way to communicate with another user—given each party's preferences of when and how to be reached. Users of traditional telephone services and Private Branch Exchanges (PBXs) in the enterprise, as well as mobile and Internet communications have at present separate devices, identities and subscriptions for each communication service. These users can possess, for example, a home phone, (often with separate local and long distance service), a PBX phone at work, a mobile phone and such as a Personal Digital Assistant (PDA) that may also have mobile phone network and Wireless Local Area Network (WLAN) access to the Internet 707 or to the enterprise PBX.

Additionally, users of Instant Messaging (IM) may also have several accounts that can be used with a PC or laptop computer. Likewise, users of e-mail and mobile Short Messaging Systems (SMS) may also use dedicated devices and networks for each particular system, though some bridging between e-mail systems and separately between SMS and IM is sometimes possible. Separate subscriptions and mobile devices for access to these services is still required.

According to one embodiment of the present invention, seamless communications (using presence, SIP events, text, voice, video communications and file sharing) is enabled in conjunction with a single identity or a suite of similar identifiers. That is, the multimodal device 701 enables a user to have a single identity and a single service subscription on all mobile and fixed networks, whereby the device 701 can operate in dual modes to communicate using any wireless or wired network. One single identity can take the form of a phone number and/or a URI (same or similar to the e-mail address) for all fixed and mobile networks and for all types of communications. The phone number and/or URI can be the only entry in the address book, by which the called party can be both reached and identified. A single identity is provided for the caller for access to all wired and wireless networks. Also, a single subscription can be utilized for all types of networks and devices. Further, NAT and firewall traversal is transparent to the user. Secure communications can be achieved based on network asserted user identity and encryption on demand.

The mobile device 701 can interwork with PBXs (not shown) or can provide PBX-like services. Calls and conferences can be maintained while switching between the wireless networks 705 (e.g., 2G/3G (2$^{nd}$ Generation/3$^{rd}$ Generation) mobile phone networks 703, Wi-Fi™/WiMax wireless broadband) and a wired PSTN 711 (or PBX network).

The Presence, Events, and IM Gateway 319 provides gateway services from SIP to and from other protocols to enable seamless and interoperable presence, events, and instant messaging (IM). Presence, events and instant messaging (IM) have evolved as core new communication services on the Internet and in private IP networks with hundreds of million users worldwide. Leading edge mobile phone services, such as push-to-talk are based on presence, events and IM. It is no coincidence that telephony has become an adjunct to popular IM services, where making a phone call is just another option to choose from various other communication modes. IP-IP voice calls are also enabled, without the use of telephone network or dependency on phone numbers.

In both wired and wireless networks, Graphical User Interfaces (GUIs) with the presence of "buddies" can be more useful than displaying phone numbers. That is, the clicking on presence icons is perceived as more useful than using the dial pad. The dial pad remains an option when connecting to traditional TDM networks using phone numbers only.

The IM infrastructure is completely separate from other forms of communications, such as voice, video, conferencing, etc. Conventionally, IM services are proprietary and require gateways for at least some degree of basic communications between disparate systems.

The adoption of the SIP IM Protocols Leveraging Extensions (SIMPLE) by the mobile industry in the 3G IMS (Third Generation IP Multimedia Service) platform as well as by large technology vendors is due to the desire to have a single SIP based communication infrastructure for all IP communication services.

Gateways between legacy IM protocols can be provided as a fully meshed architecture, where the number of gateways increases by the square of the number of protocols. However, migration to a common IM core based on SIMPLE standards is a more effective approach and provides gateways between legacy IM systems and SIMPLE. Under such a scenario, the increase in gateways is only linear with the number of IM protocols utilized.

The IM architecture, according to an embodiment of the present invention, is based on the SIMPLE standards. The presence event package describes the usage of the Session Initiation Protocol (SIP) for subscriptions and notifications of presence. Presence is defined as the willingness and ability of a user to communicate with other users on the network. The presence event package and associated notifications are more detailed, respectively in "A Presence Event Package for the Session Initiation Protocol (SIP)" by J. Rosenberg, Internet Draft, IETF work in progress, January 2003; and "Functional Description of Event Notification Filtering" by H. Khartabil et al., Internet Draft, IETF work in progress, August 2004 (both of which are incorporated herein by reference in their entireties). Traditionally, presence has been limited to "on-line" and "off-line" indicators; the notion of presence here is broader. Subscriptions and notifications of presence are supported by defining an event package within the general SIP event notification framework.

The filtering of event notifications refers to the operations a subscriber performs in order to define filtering rules associated with event notification information. The handling of responses to subscriptions carrying filtering rules and the handling of notifications with filtering rules applied to them is defined. The definition also describes how the notifier behaves when receiving such filtering rules and how a notification is constructed.

The watcher information date format defines template-package for the SIP event framework. Watcher information refers to the set of users subscribed to a particular resource within a particular event package. Watcher information changes dynamically as users subscribe, unsubscribe, are approved, or are rejected. A user can subscribe to this information, and therefore learn about changes to it. This event package is a template-package because it can be applied to any event package, including itself. Watcher functions are further detailed in "A Watcher Information Event Template-Package for SIP" by J. Rosenberg, Internet Draft, IETF work in progress, January 2003 (which is incorporated herein by reference in its entirety).

In particular, the Presence Information Data Format (PIDF) defines a basic format for representing presence information for presentity. That format defines a textual note, an indication of availability (open or closed) and a URI for communication. However, it is frequently useful to convey additional information about a user that needs to be interpreted by an automaton, and is therefore not appropriate for placement in the note element of the PIDF document. Generally, the extensions have been chosen to provide features common in existing presence systems at the time of writing, in addition to elements that could readily be derived automatically from existing sources of presence, such as calendaring systems, or sources describing the user's current physical environment.

The Presence Information Data Format (PIDF) defines a basic XML format for presenting presence information for presentity. The Extensible Markup Language (XML) Configuration Access Protocol (XCAP) allows a client to read, write and modify application configuration data, stored in XML format on a server. XCAP maps XML document sub-trees and element attributes to HTTP URIs, so that these components can be directly accessed by HTTP. Additional details of XCAP is provided in "The Extensible Markup Language (XML) Configuration Access Protocol (XCAP)" by J. Rosenberg, Internet Draft, IETF work in progress, July 2004 (which is incorporated herein by reference in its entirety).

XML Configuration Access Protocol (XCAP) allows a client to read, write and modify application configuration data, stored in XML format on a server. The data has no expiration time, so it must be explicitly inserted and deleted. The protocol allows multiple clients to manipulate the data, provided that they are authorized to do so. XCAP is used in SIMPLE based presence systems for manipulation of presence lists and presence authorization policies. Thus, XCAP is rather suitable for providing device independent presence document manipulation.

A series of related textual messages between two or more parties can be viewed as part of a session with a definite start and end. This is in contrast to individual messages each sent completely independently. Under the SIMPLE standards, messaging schemes only track individual messages as "page-mode" messages, whereas messaging that is part of a "session" with a definite start and end is called "session-mode" messaging.

Page-mode messaging is enabled in SIMPLE via the SIP MESSAGE method. Session-mode messaging has a number of benefits over page-mode messaging however, such as explicit rendezvous, tighter integration with other media types, direct client-to-client operation, and brokered privacy and security.

The Contact Information for Presence Information Data Format (CIPID) is an extension that adds elements to PIDF that provide additional contact information about a presentity and its contacts, including references to address book entries and icons. CIPID is further detailed in "CIPID: Contact Information in Presence Information Data Format" by H. Schulzrinne, Internet Draft, IETF work in progress, July 2004 (which is incorporated herein by reference in its entirety).

Presence information, e.g., represented as Presence Information Data Format (PIDF) and Rich Presence Information Data Format (RPID) describes the current state of the presentity. RPID also allows a presentity to indicate how long certain aspects of the status have been valid and how long they are expected to be valid, but the time range has to include the time when the presence information is published and delivered to the watcher. This restriction is necessary to avoid backwards-compatibility problems with plain PIDF implementations. RPID is additionally described in "RPID: Rich Presence Extensions to the Presence Information Data Format" by H. Schulzrinne et al., Internet Draft, IETF work in progress, March 2004 (which is incorporated herein by reference in its entirety). Likewise, PIDF is further detailed in "Timed Presence Extensions to the Presence Information Data Format (PIDF) to Indicate Presence Information for Past and Future Time Intervals" by H. Schulzrinne, Internet Draft, IETF work in progress, July 2004 (which is incorporated herein by reference in its entirety).

In some cases, the watcher can better plan communications if it knows about the presentity future plans. For example, if a watcher knows that the presentity is about to travel, it might place a phone call earlier.

It can also be useful to represent past information as it may be the only known presence information. Such past information may provide watchers with an indication of the current status. For example, indicating that the presentity was at a meeting that ended an hour ago indicates that the presentity is likely in transit at the current time.

Figure 8A:
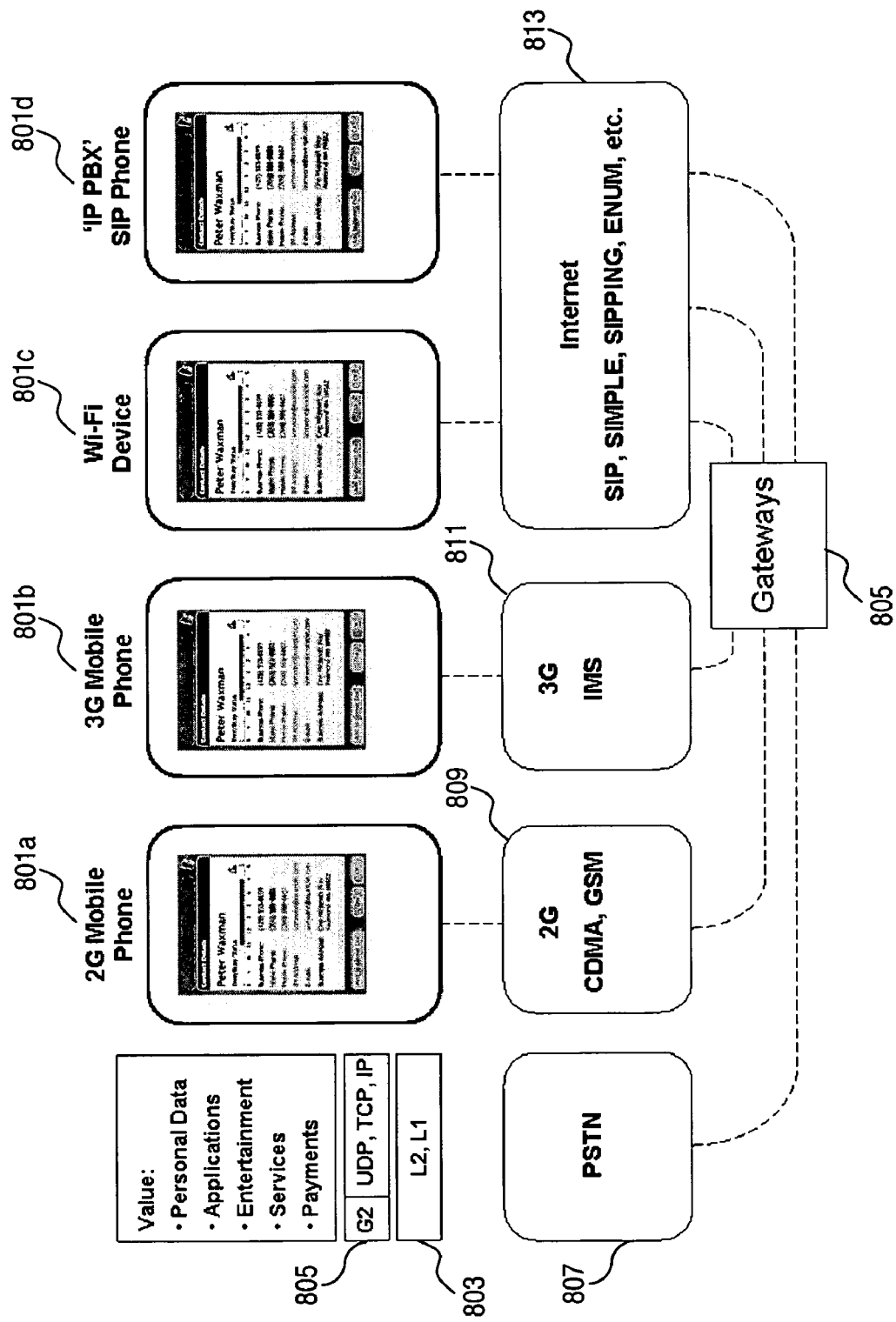
FIGS. 8A and 8B are diagrams of exemplary multimodal wireless and wired devices, according to various embodiments of the present invention.

FIG. 8 shows exemplary multimodal wireless and wired devices that can access a variety of disparate networks using pertinent communication stacks and physical network ports to those networks. According to various embodiments of the present invention, multimodal communication devices 801a-801d can have mobile phone capabilities as well as computing functions (e.g., Personal Digital Assistant (PDA)). These exemplary devices 801a-801d can provide PC-phone/PDA applications, PDA synchronization, "dial" from the PC, etc. The device 801c, for instance, can include a Wi-Fi™ terminal for use in the office or home network, and can also be a desktop speakerphone having a suitable desktop socket. By way of example, suitable sockets for the multimodal communication devices 801a-801d have one or more of the following functions: battery charger, PC/laptop synchronization, Ethernet RJ-45 jack, a speaker (e.g., for quality room speakerphone), and a color display for presence and IM without the PC/laptop.

The multimodal communication devices 801a-801d can also be a wired or wireless IP Centrex like phone with applications beyond voice—e.g., such as presence, events, IM, conferencing collaboration and games. As noted, these devices 801a-801d can assume the role of a PBX or can interwork with existing PBXs.

These multimodal devices 801a-801d advantageously provide users with enhanced capability over traditional stations, primarily because these devices 801a-801d can store and/or execute valuable data and sophisticated applications, such as personal data (e.g., address book and calendar), various office applications, entertainment (e.g., music and video files), account information for various services including converged communications, and payment mechanisms, etc.

A multimodal communication device (e.g., 801a-801d) can contain software stacks 803 and 805 for mobile networks (e.g., 2G and 3G, etc.) and for Internet access using Wi-Fi™/WiMax and wired Ethernet LANs. Accordingly, the lower stack 803 includes Layer 1 (L1) and Layer 2 (L2) protocols, while the upper stack 805 can include User Datagram Protocol (UDP), Transmission Control Protocol (TCP) and Internet Protocol (IP), as well as G2.

As shown, gateways 807 are utilized to provide seamless communications to the respective networks: PSTN 807, cellular networks 809 and 811 (e.g., 2G, Code Division Multiple Access (CDMA), Global System for Mobile Communications (GSM), etc.), and the Internet 813. For example, the 2G network 809 (CDMA and GSM) may support only voice and SMS, while the 3G network 811 may provide 3GPP IMS (3rd Generation Partnership Project IP Multimedia Subsystem) services.

In an exemplary embodiment, some of the functions described can be accomplished using a Bluetooth link between the multimodal communication device (e.g., 801a-801c) and the PC/laptop or with a Bluetooth enabled SIP phone that is connected to the Internet 813—notably for such functions as ICE and STUN/TURN servers for NAT and firewall traversal.

The following process describes network and service access to Internet based SIP services by the multimodal devices 801a-801d. First, an IP address is obtained, for example, using Dynamic Host Configuration Protocol (DHCP). Thereafter, Internet access is achieved. ICE provides determination of the optimum NAT/firewall traversal. The device 801a, for instance, can then register with the home SIP registrar to receive the SIP based IP communication services. According to one embodiment of the present invention, a SIP re-INVITE is utilized to switch between networks without leaving an established session, such as a conference.

Smooth handoff in wireless networks can be readily accomplished at the Network Layer 2, in the respective radio networks, such as in 2G/3G or Wi-Fi™/WiMax networks. The user may be prompted by the mobile device 801a to approve the switch from one network type to another, such as when switching from the mobile 2G network 809 to an enterprise or hot spot Wi-Fi™ network (not shown). In contrast to approaches where both a visited SIP registrar and a home SIP registrar are utilized, the system can utilize a single SIP registrar (e.g., the home registrar).

It is also contemplated that similar techniques may be applied for allowing a user to move from one device/interface to another while maintaining a given session.

Figure 8B:
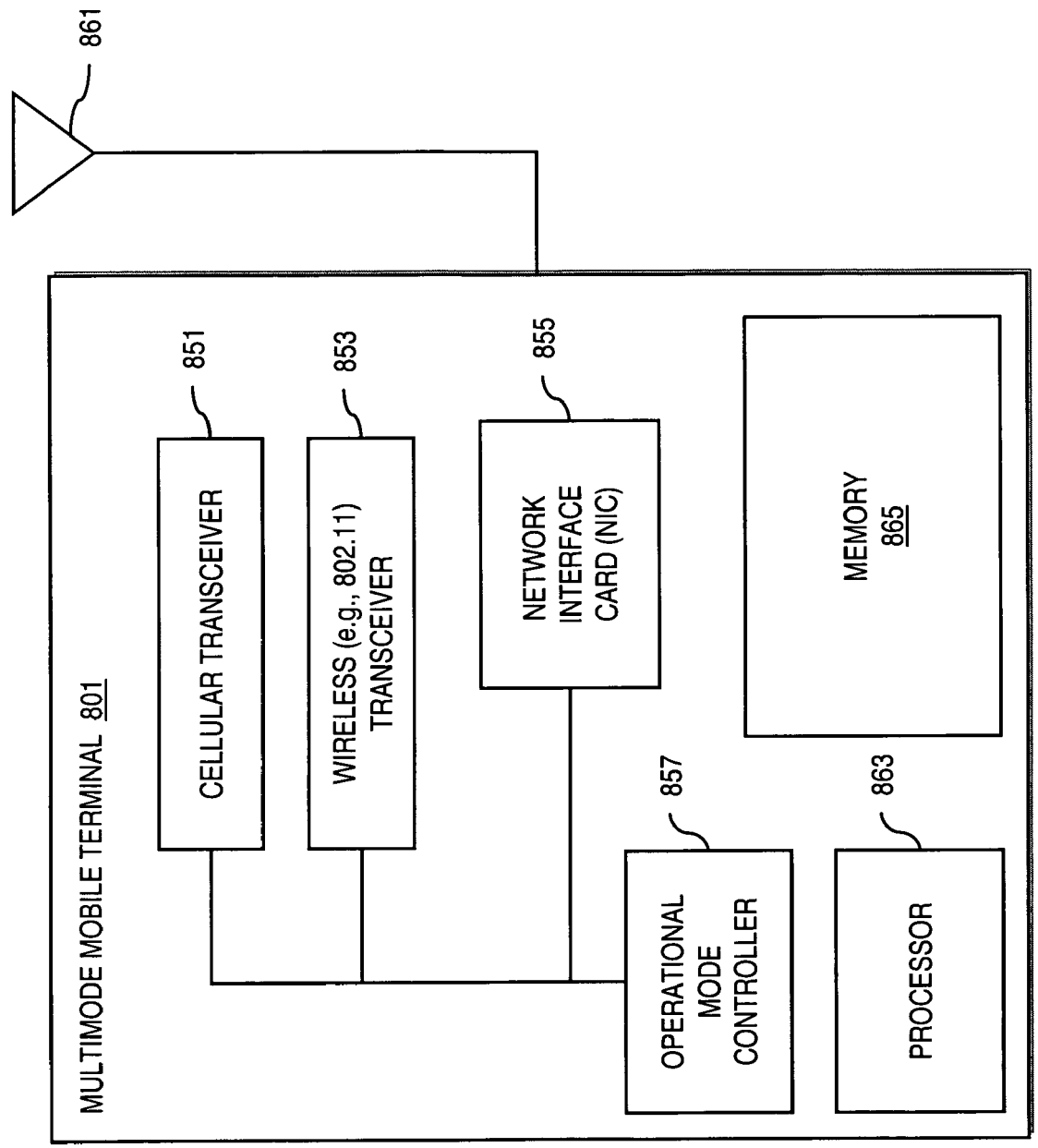

As seen in FIG. 8B, the multimodal mobile device 801 (of FIG. 8A) includes a cellular transceiver 851 for communication with cellular systems. A wireless transceiver 853 is also included for connecting to wireless networks (e.g., 802.11, etc.). Further, a network interface card (NIC) 855 is provided for connectivity to a wired network; the NIC 855 can be an Ethernet-type card. Use of the transceivers 853, 855 or NIC 855 depends on the mode of operation of the device 801, and is controlled by a controller 857. Radio transmissions can be relayed via the antenna 861.

The multimodal mobile device 801 additionally includes a processor 863 for executing instructions associated with the various applications (e.g., PDA functions and applications, etc.), as well as memory 865 (both volatile and non-volatile) for storing the instructions and any necessary data.

FIGS. 9-15 are diagrams of various call flows involving the multimodal devices. For the purposes of explanation, these processes are described with respect to the system 700 of FIG. 7.

Figure 9:
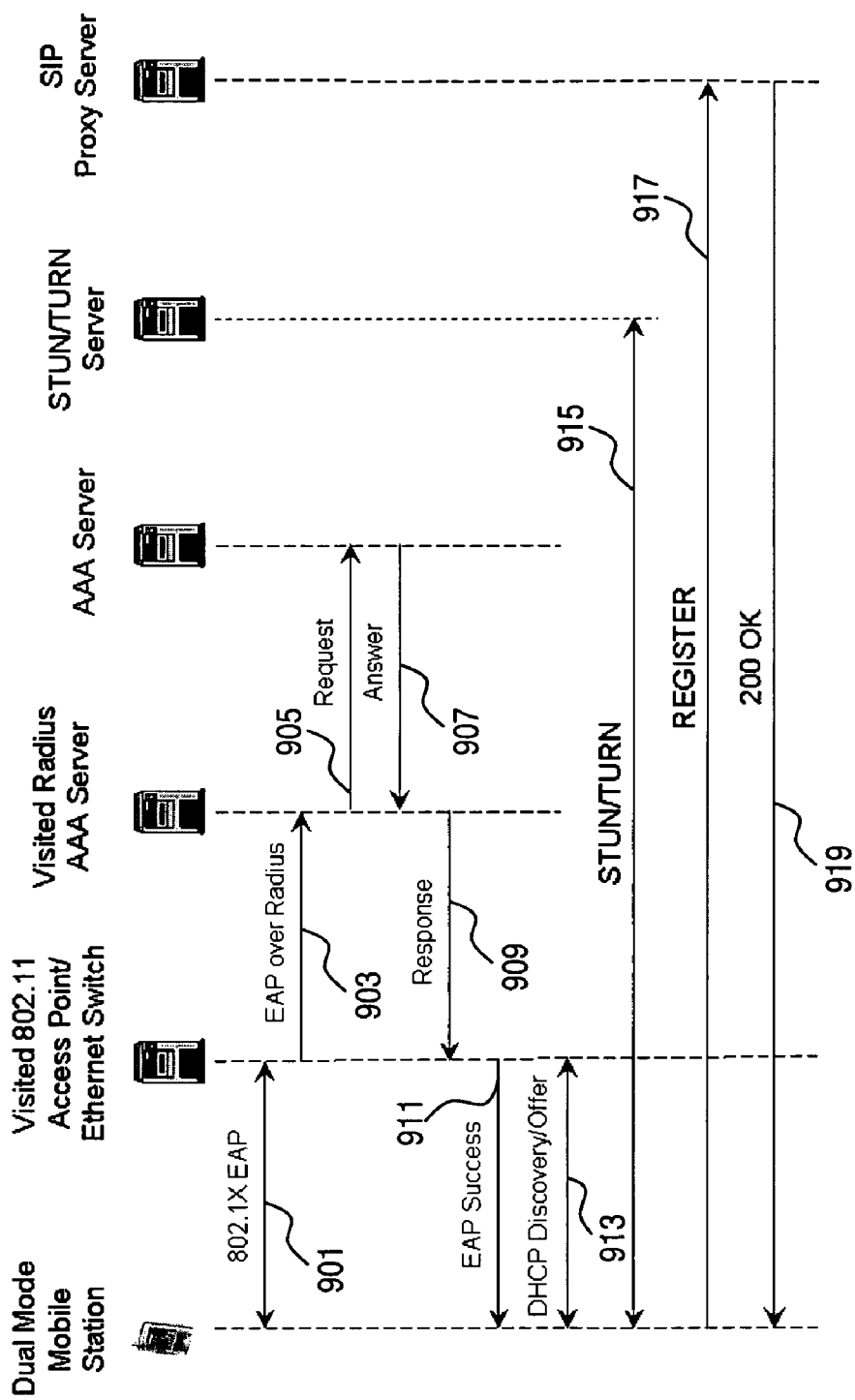
FIG. 9 is a diagram of a process for authentication and registration of a multimodal device in a data network, according to one embodiment of the present invention.

FIG. 9 is a diagram of a process for authentication and registration of a multimodal device in a data network, according to one embodiment of the present invention. In step 901, the mobile station 801 connects to the Access Point 713 (which in this example is an 802.1 access point/Ethernet switch) using an Extensible Authentication Protocol (EAP).

The Access Point 713 then communicates using EAP over RADIUS, as in step 903, with the AAA server 715. This server 715 is considered a "visited" RADIUS AAA server 715. The AAA server 715 then issues a Request message for authentication to the AAA server 717 of the service provider network 709 (step 905). The AAA server 717 responds with an Answer message, per step 907. In turn, the Visited AAA server 715 returns a Response message to the Access Point 713, which signals an EAP Success to the mobile station 701, per steps 909 and 911.

In step 913, the mobile station 701 and the Access Point 713 perform a Dynamic Host Configuration Protocol (DHCP) process. Next, the mobile station 701 establishes communication with the STUN/TURN server 719, as in step 915. Thereafter, communication with the SIP server 721 is executed by the mobile station 701 through a REGISTER and 200 OK exchange, per steps 917 and 919.

Figure 10:
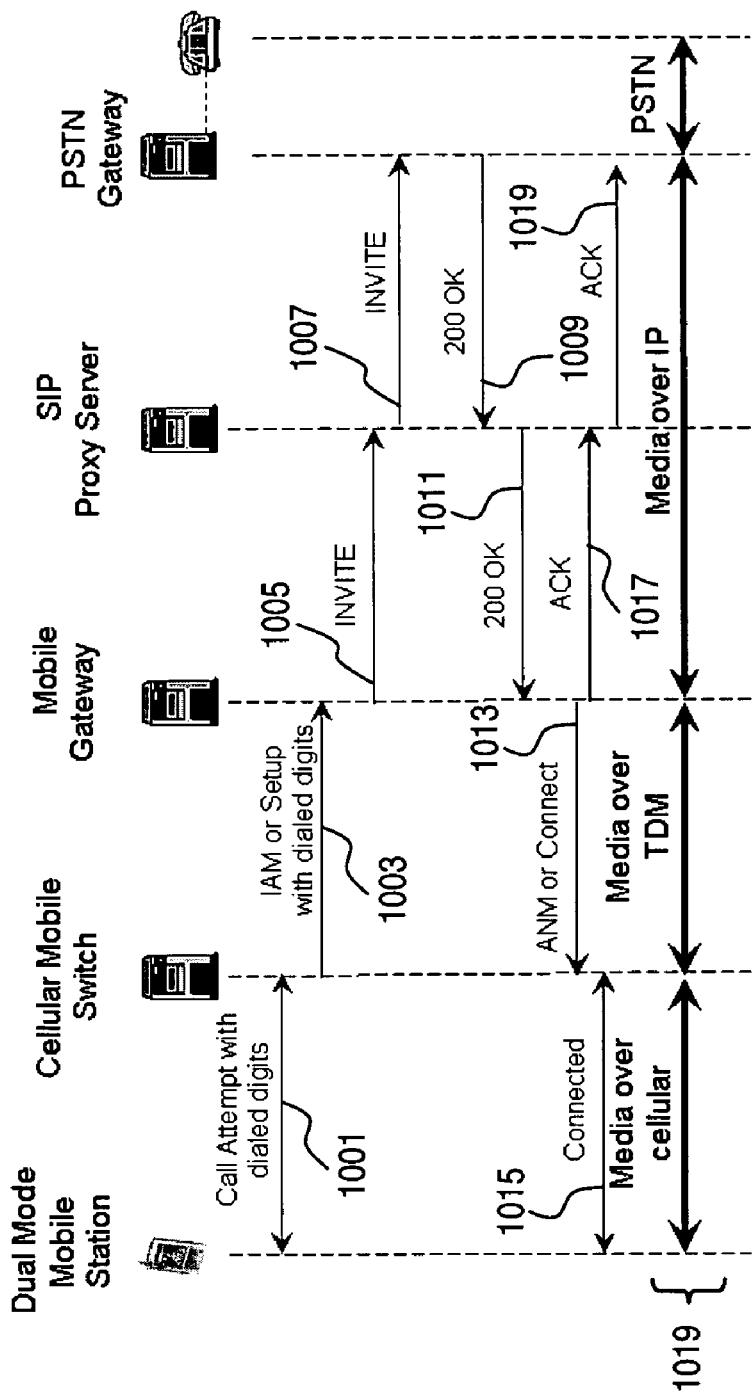
FIG. 10 is a diagram of a process for establishing a call from a multimodal device to the PSTN, according to one embodiment of the present invention.

FIG. 10 is a diagram of a process for establishing a call from a multimodal device to the PSTN, according to one embodiment of the present invention. By way of example, this call flow is performed in cellular (e.g., 2G) mode, whereby the mobile station 701 performs a call attempt specifying the dialed digits to the cellular mobile switch 723 (step 1001). In step 1003, the cellular mobile switch 723 signals a call setup request (ISUP Initial Address Message (IAM) or Setup with dialed digits) to the mobile gateway 725. The gateway 725 then generates an INVITE message to the SIP proxy server 721, per step 1005. The server 721 conveys the INVITE to the PSTN gateway 727, which responds with a 200 OK message (steps 1007 and 1009).

The SIP proxy server 721 forwards, as in step 1011, to the mobile gateway 725. This gateway 725 consequently sends, per step 1013, an Answer Message (ANM) or Connect message to the cellular mobile switch 723. In step 1015, the switch 723 signals a Connected message to the mobile station 701.

Per step 1019, the mobile station 701 and a phone off the PSTN can begin communicating as a call is now established.

The above call flow involves a call being initiated by the mobile station 701; the following process describes a call being received by the mobile station 701 from a station within the PSTN 711.

Figure 11:
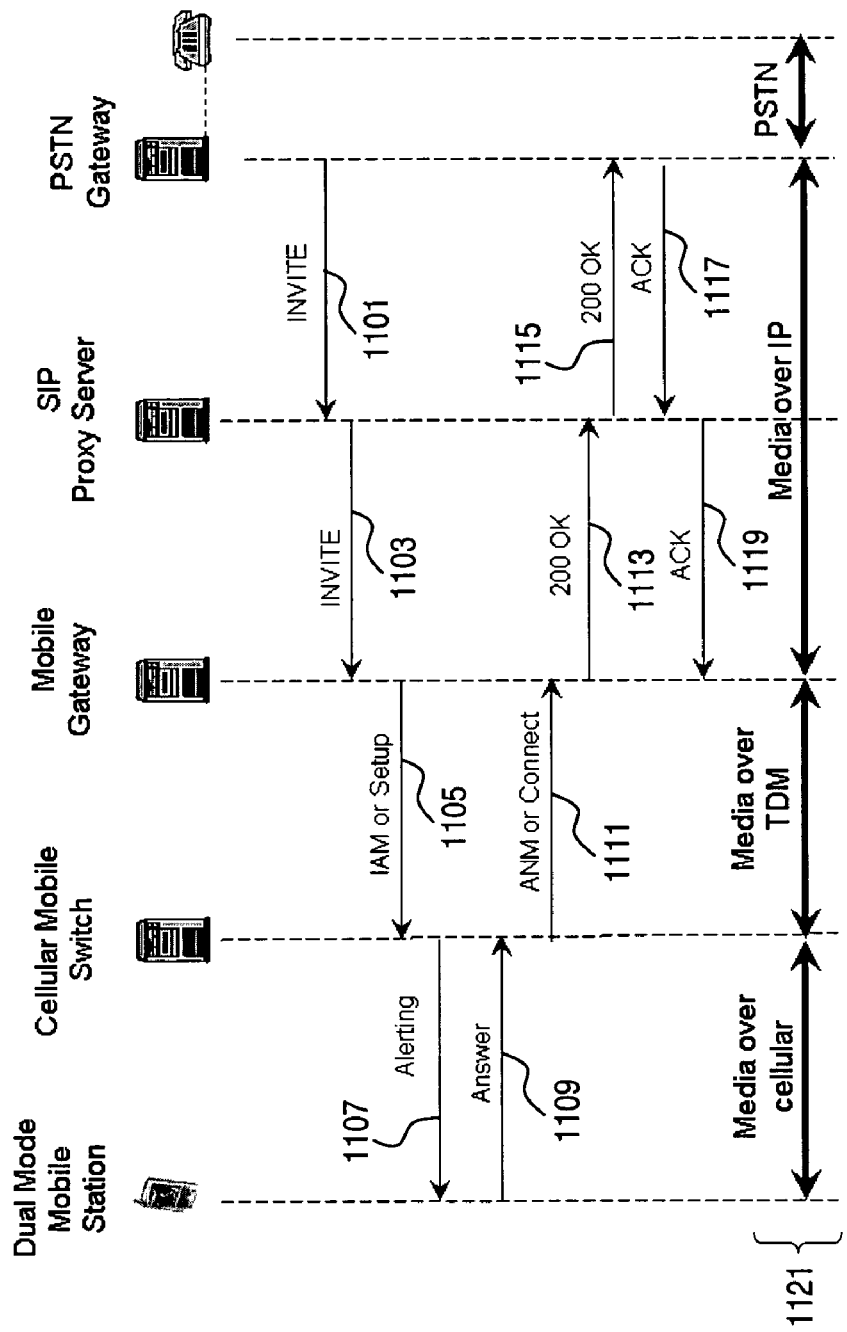
FIG. 11 is a diagram of a process for establishing a call to a multimodal device from the PSTN, according to one embodiment of the present invention.

FIG. 11 is a diagram of a process for establishing a call to a multimodal device from the PSTN, according to one embodiment of the present invention. In this scenario, a station within the PSTN 711 places a call to the mobile station 701. The PSTN gateway 727 sends an INVITE message, per step 1101, to the SIP proxy server 721, which forwards the INVITE message to the mobile gateway 725 (step 1103). In step 1105, the mobile gateway 725 sends an IAM or Setup message to the cellular mobile switch 723. The switch 723 then signals an Alerting message to the mobile station 701, per step 1107. In step 1109, the mobile station 701 responds with an Answer to the cellular mobile switch 723. The switch 723 next relays an ANM or Connect message, as in step 1111, to the mobile gateway 725.

In response to the Connect message, the mobile gateway 725 transmits a 200 OK message to the SIP proxy server 721 (step 1113). This server 721 subsequently forwards the 200 OK message to the PSTN gateway 727, per step 1115. In step 1117, the PSTN gateway 727 replies with an ACK message to the SIP proxy server 721, which relays this message to the mobile station 725 (step 1119). Thereafter, a call is established between the mobile station 701 and the originating station, as in step 1121.

Figure 12:
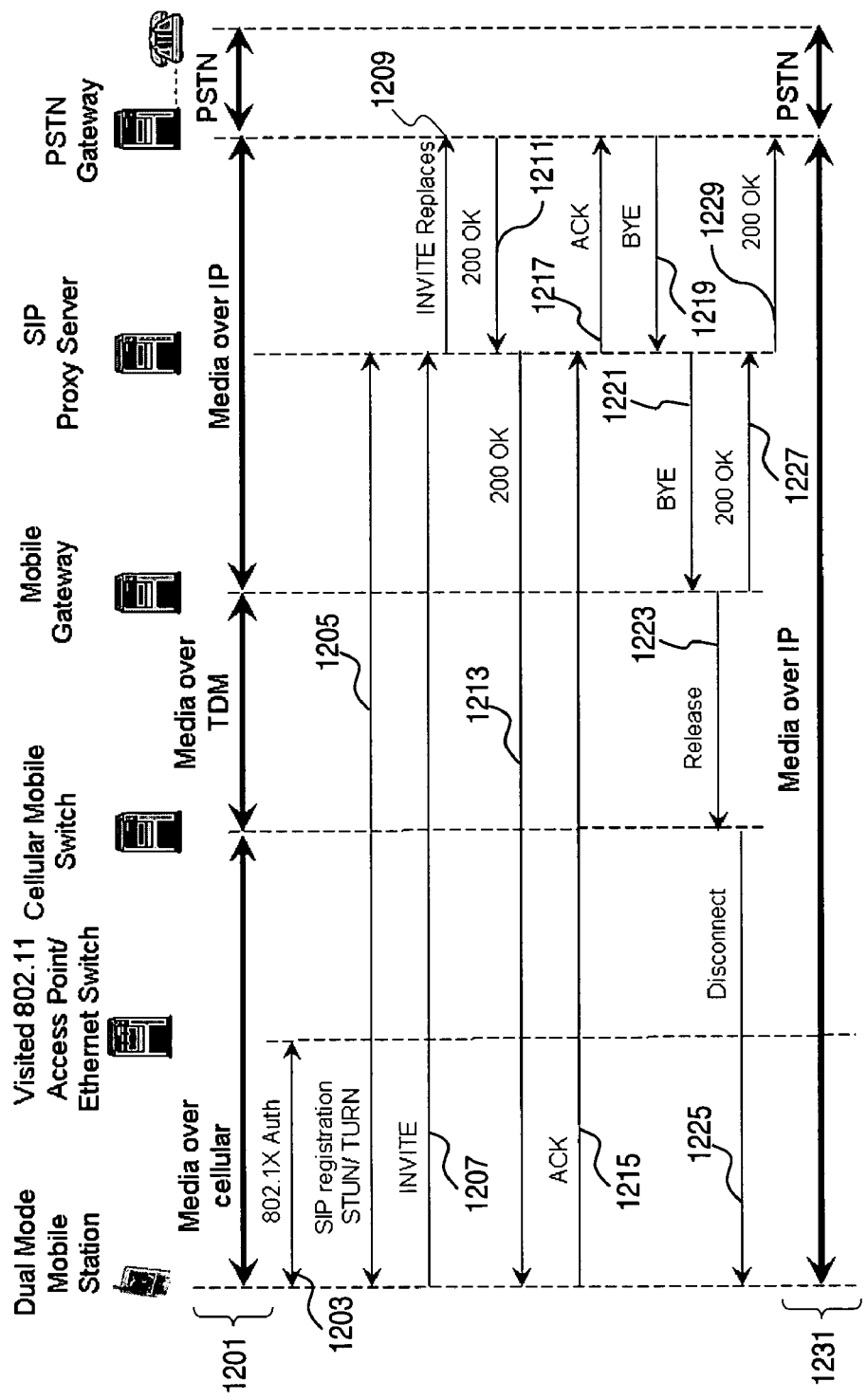
FIG. 12 is a diagram of a process for cellular-to-IP mode switching during a call supported by the PSTN, according to one embodiment of the present invention.

FIG. 12 is a diagram of a process for cellular-to-IP mode switching during a call supported by the PSTN, according to one embodiment of the present invention. It is assumed that a cellular call (in 2G) is in progress (step 1201). In step 1203, the mobile station 701 authenticates with the Access Point 713. Also, the mobile station 701 performs SIP registration (STUN/TURN) via the SIP proxy server 721, per step 1205. Next, the mobile station 701 sends an INVITE message to the SIP proxy server 721, which communicates with the PSTN gateway 727 (steps 1207 and 1209). The PSTN gateway 727 replies with a 200 OK message, per step 1211; the gateway 727 forwards the 200 OK message to the mobile station 701 (step 1213).

After receiving the 200 OK message, the mobile station 701 replies, as in step 1215, to the SIP proxy server 721 with an ACK message. Per step 1217, the SIP proxy server 721 transmits the ACK message to the PSTN gateway 727.

At this stage, the PSTN gateway 727 signals the termination of the 2G call with a BYE message to the SIP proxy server 721, per step 1219. The proxy server 721 forwards the BYE message to the mobile gateway 725, as in step 1221. In step 1223, the mobile gateway 725 sends a Release message to the cellular mobile switch 723, which sends a Disconnect message to the mobile station 701.

After sending the Release signal, the mobile gateway 725 also sends a 200 OK message, as in step 1227, to the SIP proxy server 721. The proxy server 721 sends the 200 OK message to the PSTN gateway 727. Therefore, an IP call is established, per step 1231.

Alternatively, the mobile station 701 can switch from an IP call to a 2G call, as next explained.

Figure 13:
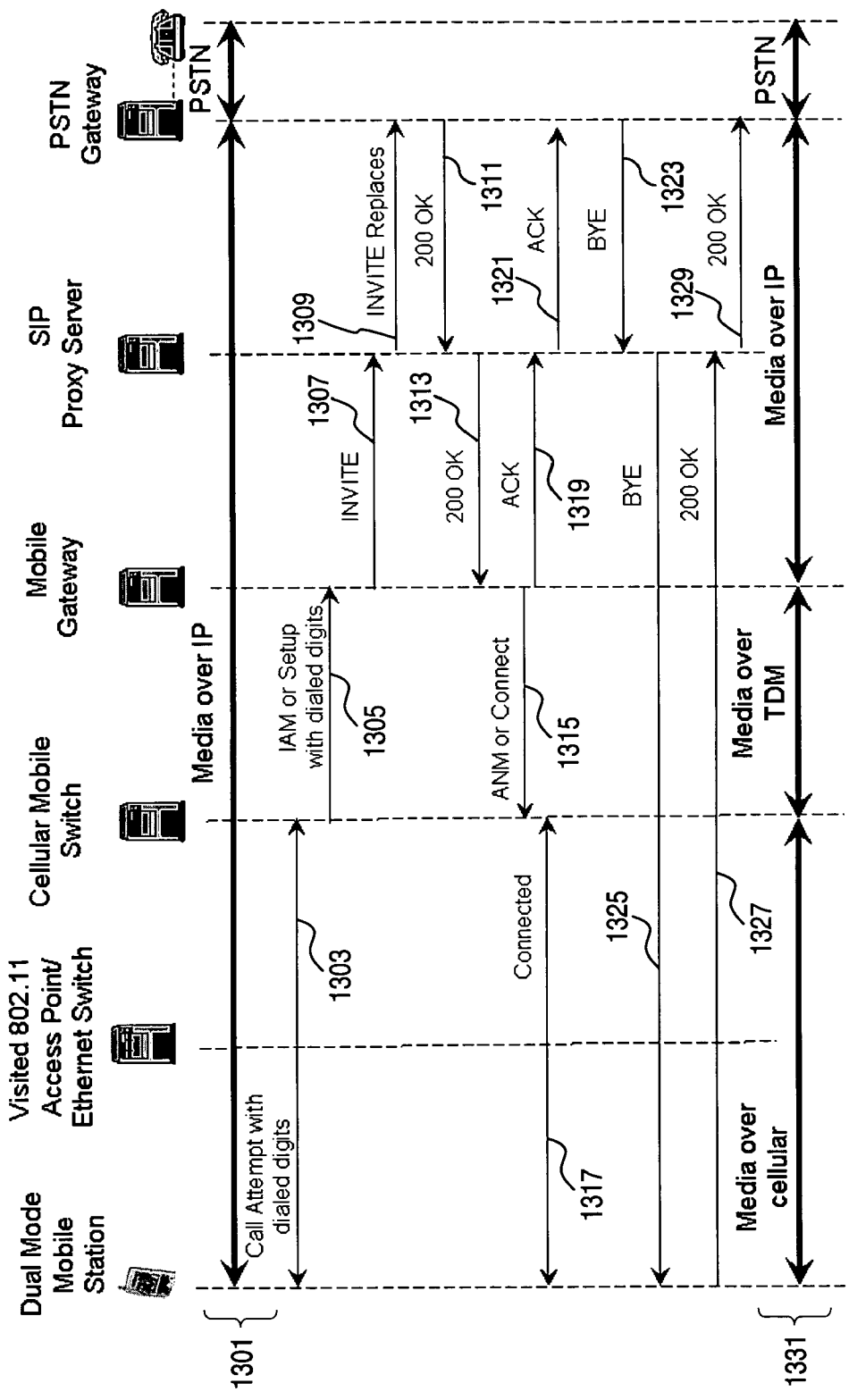
FIG. 13 is a diagram of a process for IP-to-cellular mode switching during a call supported by the PSTN, according to one embodiment of the present invention.

FIG. 13 is a diagram of a process for IP-to-cellular mode switching during a call supported by the PSTN, according to one embodiment of the present invention. In step 1301, the mobile station 701 has established a packetized voice call (e.g., operating in IP mode) with a station within the PSTN 727. The mobile station 701 sends a call attempt request, which indicates the dialed digits to the cellular mobile switch 723 (step 1303). The cellular mobile switch 723 sends a call setup request, IAM or Setup with dialed digits, to the mobile gateway 725, per step 1305. The mobile gateway 725 generates an INVITE message to the SIP proxy server 721, per step 1307. The server 721 sends the INVITE to the PSTN gateway 727 (step 1309), which responds with a 200 OK message (step 1311). The proxy server 721 sends the 200 OK message to the mobile gateway 725, as in step 1313.

In step 1315, the mobile gateway 725 sends an ANM (Answer Message) or Connect message to the cellular mobile switch 723. The switch 723 signals a Connected message to the mobile station 701, per step 1317.

The mobile gateway 725 sends an ACK message, per step 1319, to the SIP proxy server 721, which transmits the ACK message to the PSTN gateway 727 (step 1321). Thereafter, the PSTN gateway 727 sends a BYE message to the SIP proxy server 721, which forwards the message to the mobile station 701 (steps 1323 and 1325). In step 1327, the mobile station 701 transmits a 200 OK message to the SIP proxy server 721; the 200 OK message is further sent to the PSTN gateway 727 (step 1329). Consequently, a TDM call is now supported between the mobile station 701 and the PSTN station.

Figure 14:
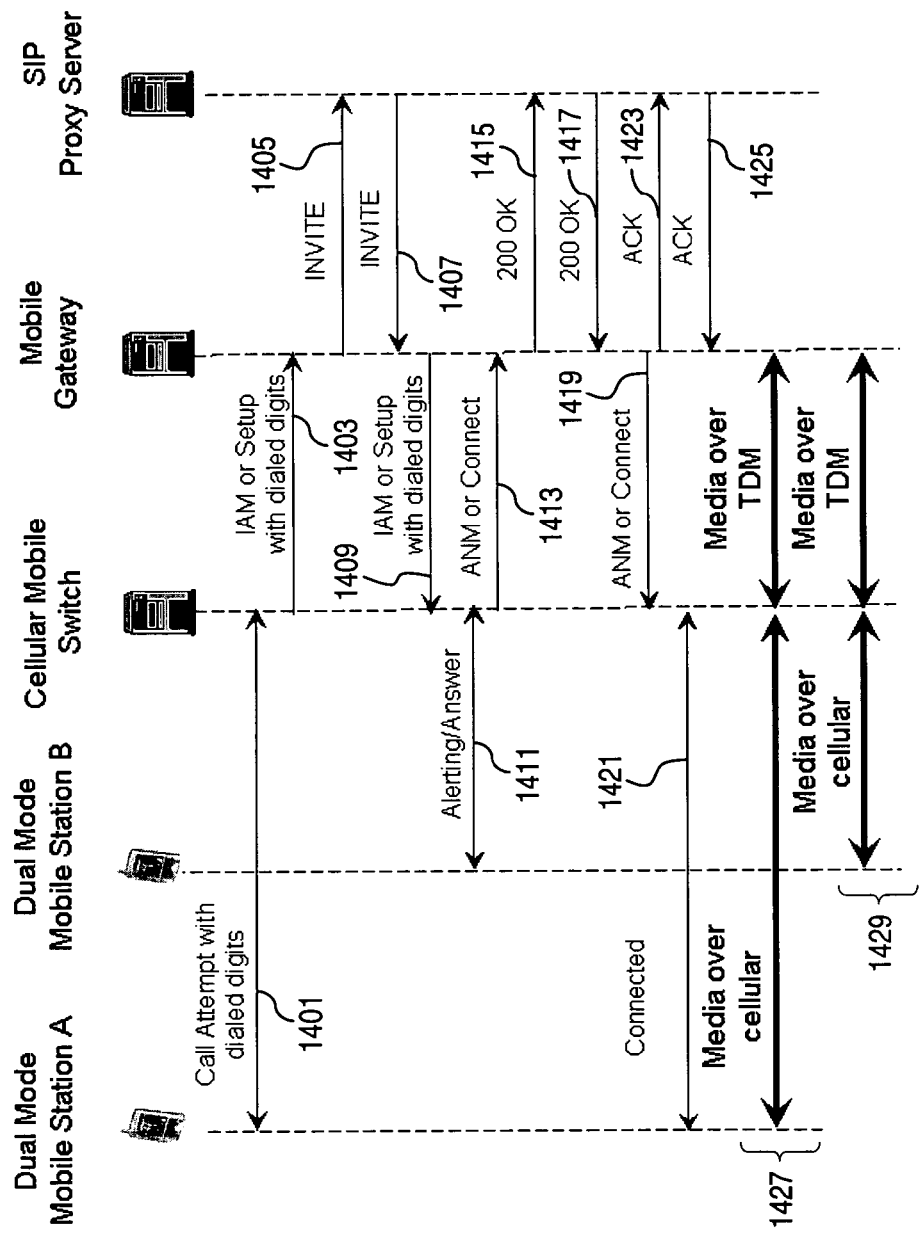
FIG. 14 is a diagram of a process for call establishment by a multimodal device operating in cellular mode, according to one embodiment of the present invention.

FIG. 14 is a diagram of a process for call establishment by a multimodal device operating in cellular mode, according to one embodiment of the present invention. Under this scenario, two mobile stations A and B are involved in the call flow. The mobile station A signals a call attempt with the cellular mobile switch 723 (step 1401). The cellular mobile switch 723 sends an IAM or Setup message to the mobile gateway 725, per step 1403. The mobile gateway 725 generates an INVITE message to the SIP proxy server 721, per step 1405.

In step 1407, the SIP proxy server 721 to the mobile gateway 725, which transmits an ISUP (ISDN User Part) Initial Address Message (IAM) or Setup message to the cellular mobile switch 723 (step 1409). The cellular mobile switch 723 exchanges Alerting/Answer signaling with mobile station B, per step 1411. The cellular mobile switch 723 sends an ANM or Connect message to the mobile gateway 725 (step 1413). Next, the mobile gateway 725 generates, as in step 1415, a 200 OK message to the SIP proxy server 721. The proxy server 721 responds back with a 200 OK message, per step 1417.

In step 1419, the mobile gateway 725 sends an ANM or Connect message to cellular mobile switch 723. A connection is established with the mobile station A (step 1421).

Per step 1423, the mobile gateway 725 sends an ACK message to the SIP proxy server 721, which transmits its own ACK message to the mobile gateway 725 (step 1425). Hence, the cellular mobile switch 723 has established cellular communication with both the mobile stations A and B, per steps 1427 and 1429.

Figure 15:
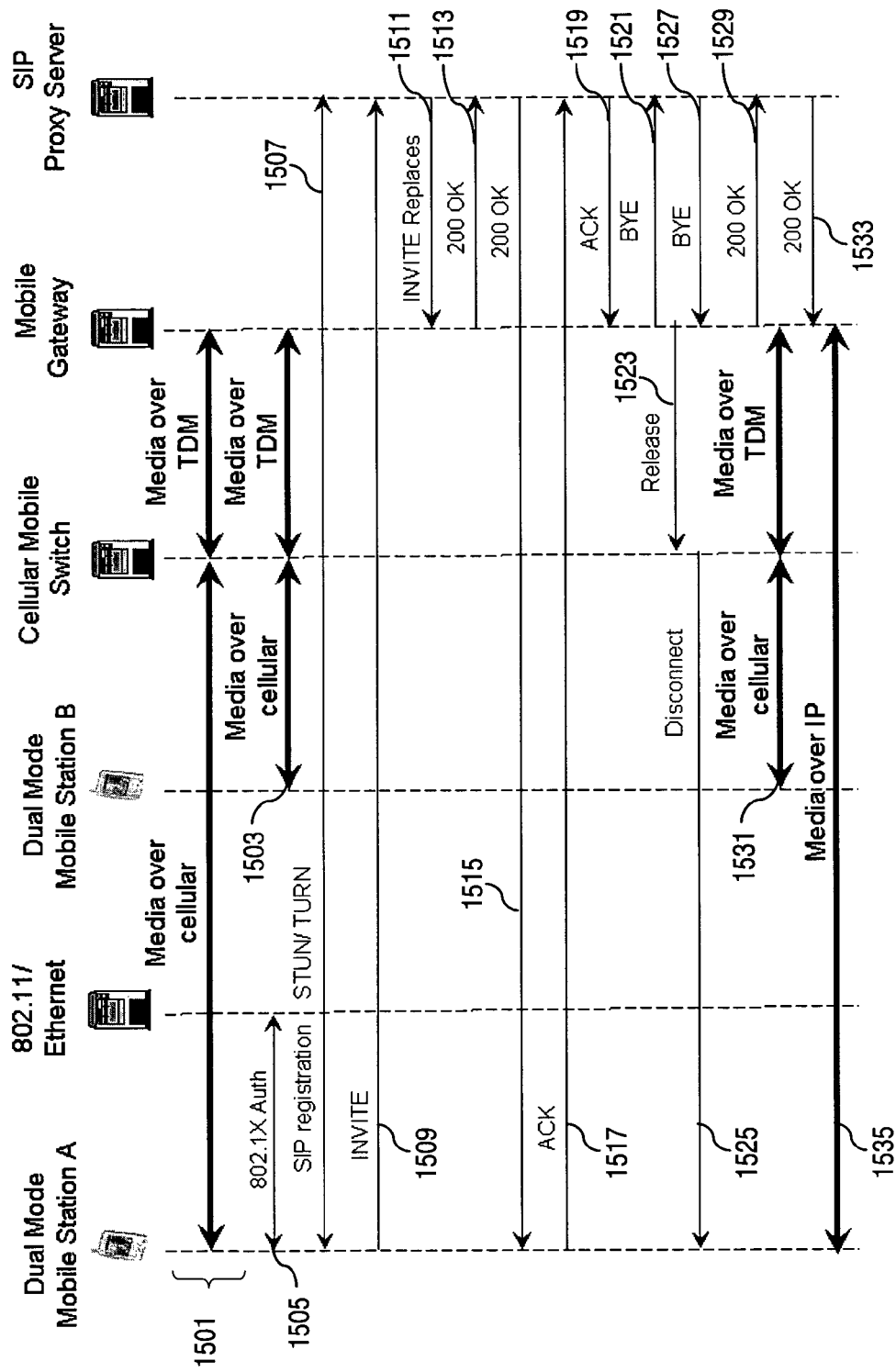
FIG. 15 is a diagram of a process for cellular-to-IP mode switching mid-call, according to one embodiment of the present invention.

FIG. 15 is a diagram of a process for cellular-to-IP mode switching mid-call, according to one embodiment of the present invention. This scenario involves a cellular call being in progress between the mobile station A and the mobile station B, as in steps 1501 and 1503. In step 1505, the mobile station A performs an 802.1 authentication with the Access Point 723. Also, the mobile station A performs SIP registration with the STUN/TURN functions via the SIP proxy server 721 (step 1507). In step 1509, the mobile station A sends an INVITE message to the SIP proxy server 721. The SIP proxy server 721 then sends an INVITE message to the mobile gateway 725, per step 1511. The mobile gateway 721 generates a 200 OK message to the SIP proxy server 721, which sends the 200 OK message to the mobile station A (steps 1513 and 1515).

In step 1517, the mobile station A forwards an ACK message to the SIP proxy server 721 in response to the 200 OK message. The SIP proxy server 721, per step 1519, sends an ACK to the mobile gateway 725. The mobile gateway 725 next sends a BYE message to the SIP proxy server 721 (step 1521).

The mobile gateway 725 next sends a Release message to the cellular mobile switch 723, which in turn issues a Disconnect message to the mobile station A (steps 1523 and 1525).

The SIP proxy server 721, in step 1527, transmits a BYE message to the mobile gateway 725, which responds with a 200 OK message (steps 1527 and 1529). At this point, the mobile station B still engaged in a cellular call leg, per step 1531. In step 1533, the SIP proxy server 721 sends a 200 OK to the mobile gateway 725. Now, the mobile station A communicating over IP media, as in step 1535.

Figure 16:
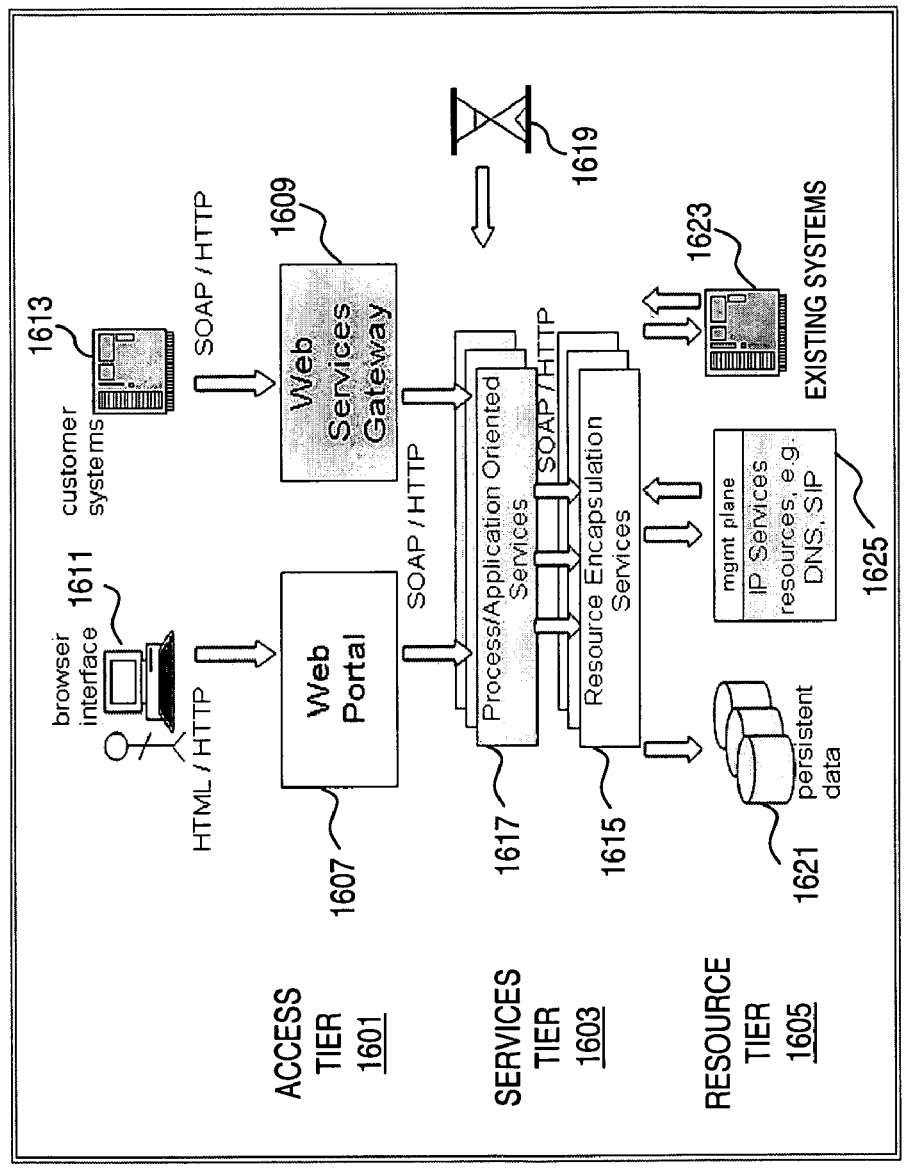
FIG. 16 is a diagram of an Operational Support System (OSS) architecture, according to one embodiment of the present invention.

FIG. 16 is a diagram of an Operational Support System (OSS) architecture, according to one embodiment of the present invention. The architecture 1600 leverages service-oriented architecture principles and associated technologies. For example, remotely callable services, implemented using Web Services standards, are used to encapsulate access to databases; encapsulate access to existing or "legacy" systems (as necessary). These services advantageously provide OSS function implementations that are modular. Additionally, the callable services provide interfaces for other systems to send notifications to IP-IC components and to request information. These services further advantageously provide a clean, platform-agnostic, standards-based decoupling between web-facing and back-end systems.

According to one embodiment of the present invention, the architecture 1600 includes three primary tiers: an Access Tier 1601, a Services Tier 1603, and a Resource Tier 1605. The Access Tier 1601 (which can also be referred to as a "Presentation Tier") permits user and system access into the OSS for customers and service provider's sales/support. The Services Tier 1603 is the focal point of the OSS architecture 1600, where a majority of the functionalities reside. Lastly, the Resource Tier 1605 encompasses the elements that the services act upon. The OSS architecture 1600 manages these various resources.

According to one embodiment of the present invention, the subsystems of the Access Tier 1601 include a Web Portal 1607, a Web Services Gateway 1609, and an Identity Management and Access Control component (not shown). These interrelated components allow human users (e.g., customer employees or service provider's staff) and customer systems 1611 to access the OSS services via, for example, web browser 1611 or via Simple Object Access Protocol (SOAP) invocations.

In an exemplary embodiment, the external access architecture are as follows. A web server is provided in a DMZ. Also, programming and runtime environment is supported for dynamic generation of HTML pages and for handling incoming web requests. An XML firewall is deployed for screening and routing inbound SOAP traffic coming into DMZ from customers. Also, by way of example, web server agents are plugged into the web server and XML firewall. Further, a Policy Server and LDAP backing store can be utilized.

The identity administration allows authorized users to be added, and to permit these users to enter orders, update information, provision users, etc., on behalf of their organization or company. This administration function enable delegation of administration privileges to customer administrators, allowing them to add further users and grant them access privileges. It is assumed the service provider has some control in identity administration, as the customer cannot be completely self-managed using, e.g., web self-service. It is important to note that this identity administration function is distinct from end-user identity management within the core SIP telephony components. The identity administration is concerned with administrative accounts that allow customer employees to interact with the OSS systems online to allow customer self-service.

The Services Tier 1603 includes services that are mainly concerned with encapsulating resources, such as data and other managed resources, through Resource Encapsulation Services 1615. The Services Tier 1603 also includes application process activities 1617—behavior, or actually doing something.

As shown, the arrows directed into the Services Tier 1603 constitute event sources that trigger activities within the services. Exemplary triggering events involve activities undertaken by the customer via web browser, notifications coming in from legacy systems (e.g., Accounts Receivable informing that a given customer has paid its bill), and management-related notifications originating from IP Services components in the architecture. For example, a media relay server (or its management agent) can inform the OSS services that a resource consumption metric has gone above a high-water mark 1619 and additional capacity needs to be provisioned. Also, some OSS activities are triggered by time-based events, as suggested by the hour glass. In particular, activities related to the monthly billing cycle are schedule driven.

The Resource Tier 1605 includes databases 1621 and legacy systems 1623, as well as primary IP Services components 1625 (which are at the core of the IP-IC offering).

Figure 17:
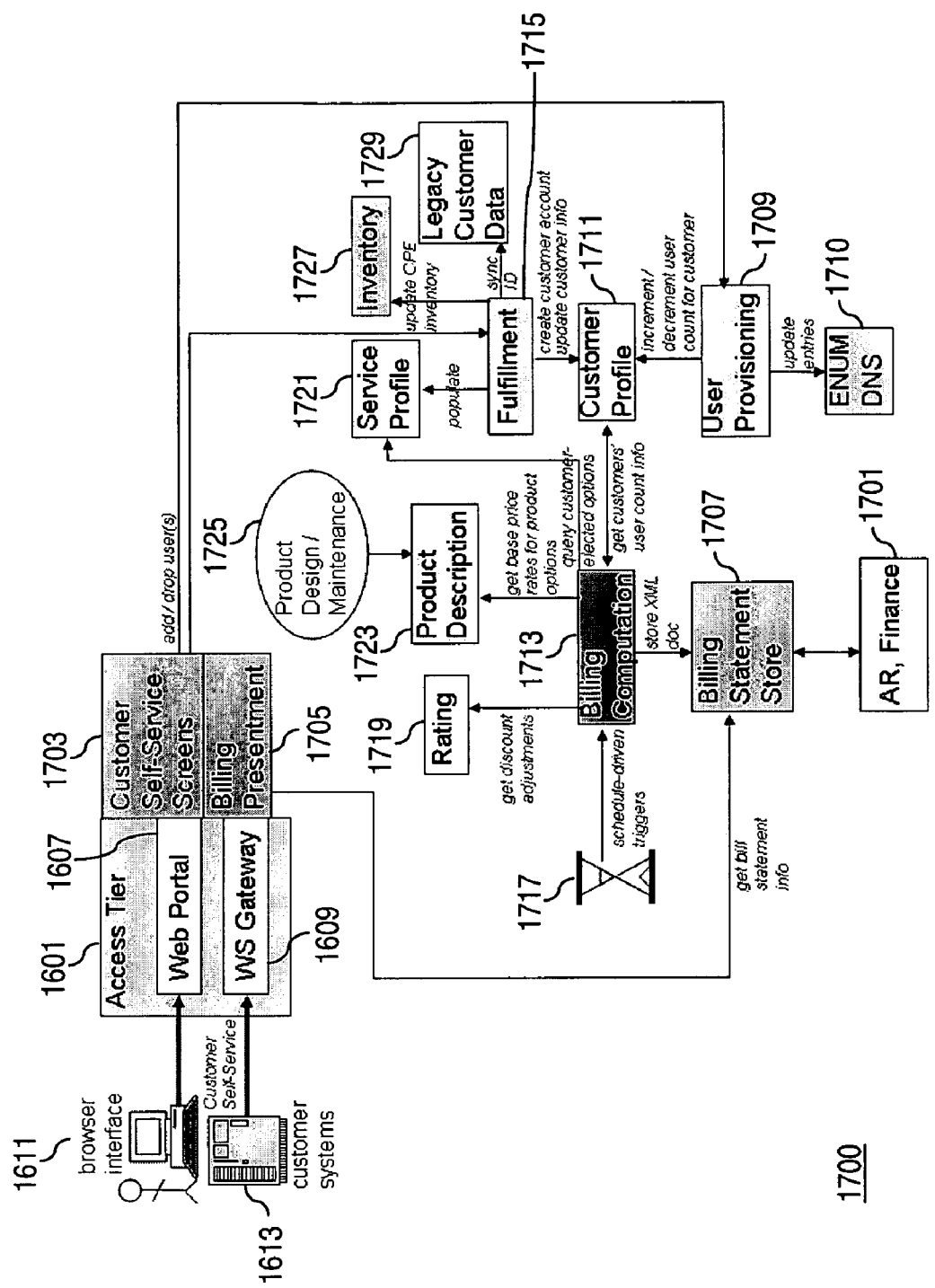
FIG. 17 is a diagram of a financial system for supporting IP Interconnect service, according to one embodiment of the present invention.

FIG. 17 is a diagram of a financial system for supporting the IP interconnect service, according to one embodiment of the present invention. The system 1700 permits the IP-IC components to largely perform their own billing computation and presentment and to integrate with existing financial systems 1701 (e.g., Accounts Receivable (AR) or other Finance systems). Alternatively, the system 1700 assume the integration is a responsibility of these existing (or "legacy") financial systems 1701. In either case, the system 1700 provides for encapsulating this integration point with a Web Service—this is transparent to the other components specific to the IP-IC OSS. For example, a clean SOAP interface to those existing systems is used, even if that interface hides the legacy complexity of document file transfer using proprietary data formats.

As FIG. 17 shows, User Provisioning is invoked by the Access Tier 1601, driven by customer self-service events. The Access Tier 1601 then pushes updates to the Customer Profile service and the ENUM/DNS servers. In one embodiment, the system 1700 employs a GUI 1703, which provides one or more Customer Self-Service screens to permit the user to provision and manage their services. A Billing Presentment component 1705 is also provided.

In an exemplary embodiment, presentment can be performed electronically via the web portal 1607. The Billing Presentment component 1705 can be though of as presentation code in the Web Portal 1607, which draws the underlying statement information for each given customer from the Billing Statement store 1707, and renders that into, for example, HTML markup for presentation to the user.

The User Provisioning component 1709, in an exemplary embodiment, is a Web Service which provides interfaces for a single user, or a set of multiple users (possibly thousands), to be added to the system 1700. The end-result of user provisioning, for instance, is that ENUM mappings for the user(s), telephone number to SIP URI, are added to the ENUM DNS server or servers 1710. Also, customer profile information is adjusted to increment or decrement the current user count field for the customer or customers. According to one embodiment of the present invention, mirror databases are updated with the ENUM mapping information. This information can be captured in database format (in addition to DNS) for other uses, e.g., to support white pages directory.

Because the User Provisioning component is implemented as a Web Service, the Application Programming Interface (API) can include methods for adding a single user to the system, dropping a single user from the system, bulk-loading an array of users to the system, and for performing bulk drops. These API functions can be exposed to the customers as XML Web Services interfaces, which the customer systems 1613 can programmatically call. The customer self-service screens of the IP-IC Web Portal can also provide Graphical User Interface (GUI) interfaces allowing customer administrative personnel to add and drop users.

Additionally, the User Provisioning component 1709, according to one embodiment of the present invention, performs dynamic updates to the DNS server or servers. By way of example, the dynamic update can be executed by using public domain Java™ APIs into DNS, using available C language library and use JNI to support binding of Java™ code to object code, or exercise available DNS management interfaces. In an exemplary embodiment, one of the roles of the User Provisioning service is to hide the exact details of this DNS binding from upstream systems, so all these upstream systems "see" a simple Web Service interface.

When the User Provisioning component 1709 adds or drops a user (or users) for a given Customer, the Customer Profile service 1711 updates bookkeeping on the user count. This can include updating a current user count field and updating a monthly peak user count field with respect to the User Provisioning component 1709. The Customer Profile component 1711 also interacts with a Billing Computation component 1713 and a Fulfillment (also referred to as an Order Management/Customer Provisioning) component 1715.

Within the IP-IC service, the notion of provisioning can occur, in an exemplary embodiment, at two different levels: (1) provisioning and de-provisioning of individual SIP end-users (an ongoing activity), and (2) provisioning of customers. In contrast with up-front activities of provisioning a new customer, configuring a given customer facility or PBX to point to IP-IC DNS, redirect, relay and/or signaling conversion servers, etc. The User Provisioning service 1709 described in this example focuses on the former notion of provisioning the SIP end-user, not customer-level provisioning. The Fulfillment component 1715 focuses on the customer-level sense of provisioning.

According to an embodiment of the present invention, the Billing Computation component (or engine) 1713 is a service that is primarily process-oriented. It is triggered by a scheduler 1717—e.g., on a monthly billing cycle. Depending upon the service pricing model, the Billing Computation component 1713 can also be triggered on a daily basis in order to take a daily sample of each Customer's user count. The samples can then be used to update a running accumulator for the purpose of calculating a monthly average user count, for instance.

As for the Rating component 1719, this function can be integrated into the billing computation, with regard to applying relevant discounts.

For the purposes of illustration, it is assumed that the pricing model is based upon peak user count over the course of the month, rather than the average. As discussed above, the peak user count is maintained by the Customer Profile component 1711, each time it gets an increment/decrement user count event from the User Provisioning Service 1709. On a monthly trigger event, the Billing Computation engine 1713 cycles through the customers. The Customer Profile 1711 is queried for the monthly peak user count for each customer. Each customer's Service Profile record 1721 is also consulted to determine the optional services that the customer is subscribed to. The system 1700 allows for a business model where different features are optional, such as signal conversion or media relay, and such options incur additional charges above the base offering price.

Additionally, the Billing Computation engine 1713 pulls (and caches) the current base price figures, for each option, from a Product Description store 1723. With all of this information, the Billing Computation engine 1713 can then calculate the customer's itemized charges and bottom line. The Billing Computation engine can then consult the Rating component 1719 to determine discount adjustments for the customer. Further, the Billing Computation engine 1713 prepares, for example, a XML document that represents the complete monthly information regarding what the customer bought and owes, and posts these XML documents to the Billing Statement store 1707. The Billing Statement 1707 store provides storage of these documents persistently for later consumption by the Billing Presentment component 1705 and financial systems 1701.

In an exemplary embodiment, the Billing Statement component 1707 is a data-oriented service, and supports persistent storage of the billing statement documents that are created by the Billing Computation engine 1713 for each customer (e.g., each month). Specifically, the Billing Statement component 1707 maintains storage for both the current billing cycle and for archival storage of all past billing statements.

In an exemplary embodiment, each record in the Billing Statement tables stores an ASCII document. This document can be in XML format document for detailing the itemized charges for a given customer, applied discounts and bottom line. The XML document records the detail of what the customer bought, and what the customer owe. These XML documents stored in the Billing Statement component 1707 represent all the information that is required for Billing Presentment 1705 to present an e-invoice to the customer, and for the financial systems 1701 to collect payment and report back on the status of customer payment or delinquency.

The Product Description component 1723 stores product information received from the Product Design/Maintenance component 1725. In other words, the Product Description component 1723 is mainly a data store, and records information about the product offering as a whole, plus separate information about each of the product's available options. This arrangement externalizes general information about the product so as to avoid hard-coding such information within program code. Of import is pricing information, which is likely subject to change, and best to keep in an external store. If a pricing model is adopted where separate product options are priced individually, then each option could have an associated base price (or price rate per user).

The main client of the Product Description service 1723 is the Billing Computation engine 1713, which mainly needs to extract the base pricing information in order to compute bills.

The Service Profile component 1721 is another data-oriented component, and is fed by the Fulfillment component 1715 (which can be GUI driven by Order Entry, Product Design and Customer Support web screens). The Service Profile component 1721 can be queried on a monthly cycle by the Billing Computation component 1713 in the course of calculating each customer's bill.

The Service Profile component 1721 persists the complete product description, for each customer, of the products provisioned by the customer. If the product offering has several optional features (such as signal conversion, media relay, etc.), then the Service Profile information for each customer details the options elected by the customer, along with attributes that parameterize variable quantities associated with the different product options. The Service Profile component 1721 thus represents the instantiation of the IP-IC product offering for each customer. This is in contrast with the Product Description component 1723, which embodies a description of the product as a whole, not any given customer's realization of the product. (In object-oriented parlance, the Product Description would be thought of as "class-level," and the Service Profile would be "instance-level.")

According to one embodiment of the present invention, the Fulfillment component 1715 provides a back-end to the customer self-service web screens, as well as sales/support screens related to order management and customer provisioning processes.

As noted earlier, provisioning involves multiple levels—provisioning in the sense of enabling SIP end-users to use the system; and provisioning in the sense of "turning up" a new Customer and maintaining/updating their information at a customer-level. The Fulfillment component 1715 supports the customer-level sense of provisioning, not the SIP user management, which is handled by the User Provisioning component.

Among other functions, the Fulfillment component 1715 supports establishing new customer accounts, and creating an IP-IC product specific Accounts for an existing customer. In addition, the Fulfillment component 1715 can coordinate with customer data stores of record to ensure that proper corporate Customer ID is used. The Fulfillment component 1715 also provides support for a customer entering survey of their needs and environment, which can assist sales personnel in product design/configuration. This Fulfillment component 1715 additionally provides Customer Premise Equipment (CPE) information entry, and can inform customers of the proper URLs or other binding information that they need for operational use of the various servers (e.g., DNS, ENUM Redirect, STUN, TURN, Signal Conversion gateways, etc.).

Moreover, the Fulfillment component 1715 permits customer election of product options that define what the customer is buying. For example, the component can determine whether the customer require signal conversion, media relay, etc. Further, the Fulfillment component 1715 supports entering site information.

As seen in the figure, the Fulfillment component 1715 communicates with an Inventory component 1727. In an exemplary embodiment, this Inventory component 1727 is a data component that tracks relevant resource inventory, both at the customer premises via the "legacy" customer data store 1729 and resources that are internal to the service provider. It is noted that separate stores for these two sorts of inventory information can be maintained. For example, the inventory store can be kept in a relational database. By way of example, internal resources that might be considered for storage in some sort of inventory service include CPUs (and their associated IP addresses), databases, deployed services that comprise the OSS architecture. The inventory of deployed services, according to an embodiment of the present invention, can be deployed as a service directory, such as UDDI, rather than within a relational database. UDDI is a web-based distributed directory that enables businesses to list themselves on the Internet.

Figure 18:
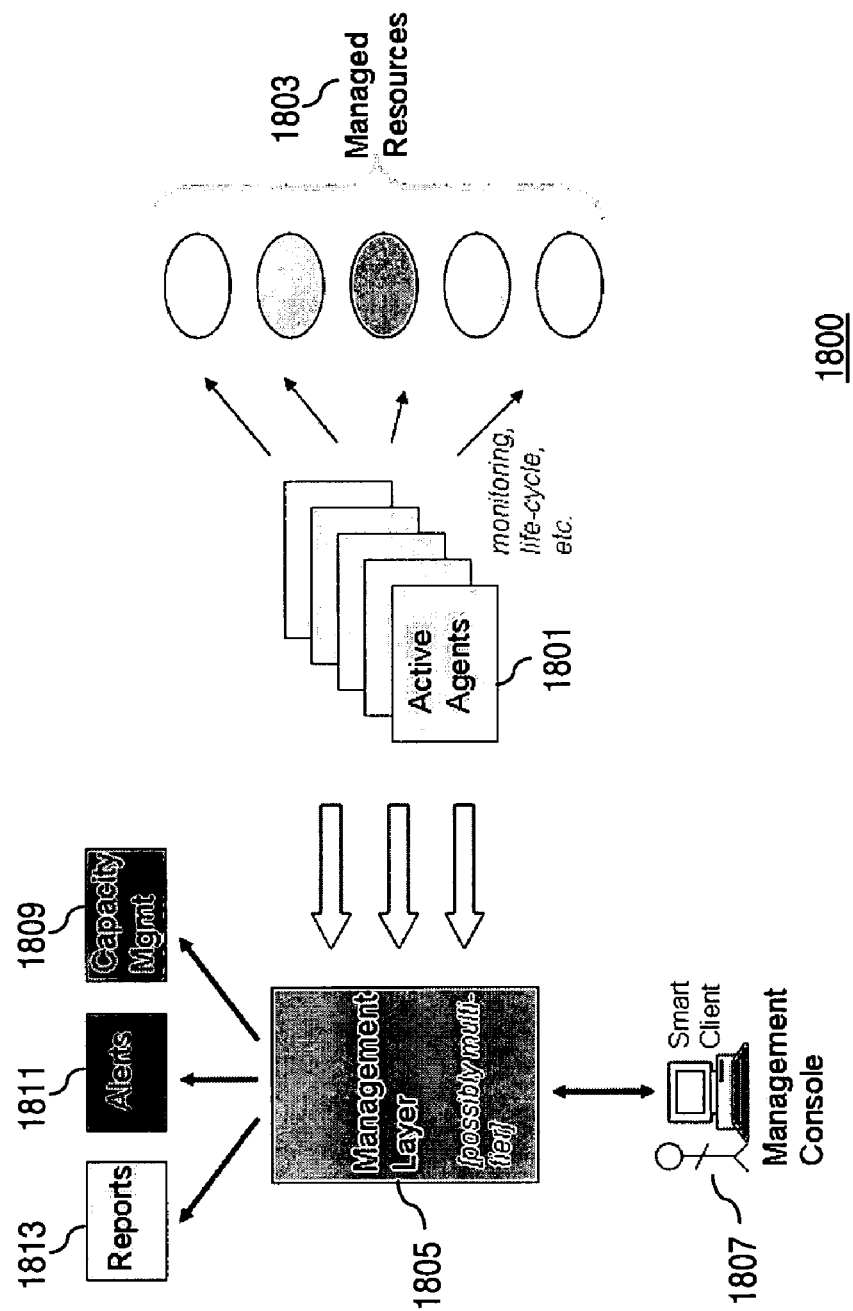
FIG. 18 is a diagram of a service assurance infrastructure components capable of supporting the Interconnect services, in accordance with an embodiment of the present invention.

FIG. 18 is a diagram of a service assurance infrastructure components capable of supporting the Interconnect services, in accordance with an embodiment of the present invention. The service assurance infrastructure 1800 can be thought of as a management plane (and somewhat orthogonal to the other functional components discussed previously). Service assurance is a broad category of functions and systems encompassing components and processes related to keeping the core systems and support systems operational. Assurance functions can include monitoring, reporting, alarm management, capacity management and planning, autonomic (self-healing) recovery techniques, Service Level Agreement (SLA) management, policy-driven resource allocation, etc.

According to one embodiment of the present invention, it is assumed that the core of the service assurance architecture is based on a Manager/Agent model. A number of different Agent types and instances ("active agents") 1801 are responsible for monitoring the vital signs of various resources 1803 (services, CPUs, databases) that make up the system environment. These active agents provide information to a Management Layer 1805, which can be single tiered or multi-tiered. The Management Layer 1805 provides information to other interested systems, such as a management console 1807, capacity management component 1809, alerts 1811, and a report engine 1813, etc.

According to one embodiment of the present invention, the Management Console 1807 can be a rich client. Such a rich client can be implemented with Java™ applets, Java™ Web-Start deployment of a Java™ application, or a .NET Smart Client, deployed perhaps with technology such as Microsoft ClickOnce technology (or via a hyper-link that resolves to an .exe, similar in spirit to the Java™ applet model).

The management infrastructure of the service assurance systems determines when and where additional CPU resource are needed; alerts could be raised, and physical capacity could be provisioned (i.e., another CPU rack installed). In light of these considerations, the Agent tier 1801 can be involved not only with monitoring health of deployed systems, but also with dynamic deployment of services into the environment—service life-cycle management. For example, the growth of the core servers (e.g., Media Relay instances) supporting the Interconnect services can be readily management using the arrangement of FIG. 18. The Media Relay instances can be deployed on-demand onto a grid-like farm of resources.

The processes described herein for supporting Interconnect services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 19:
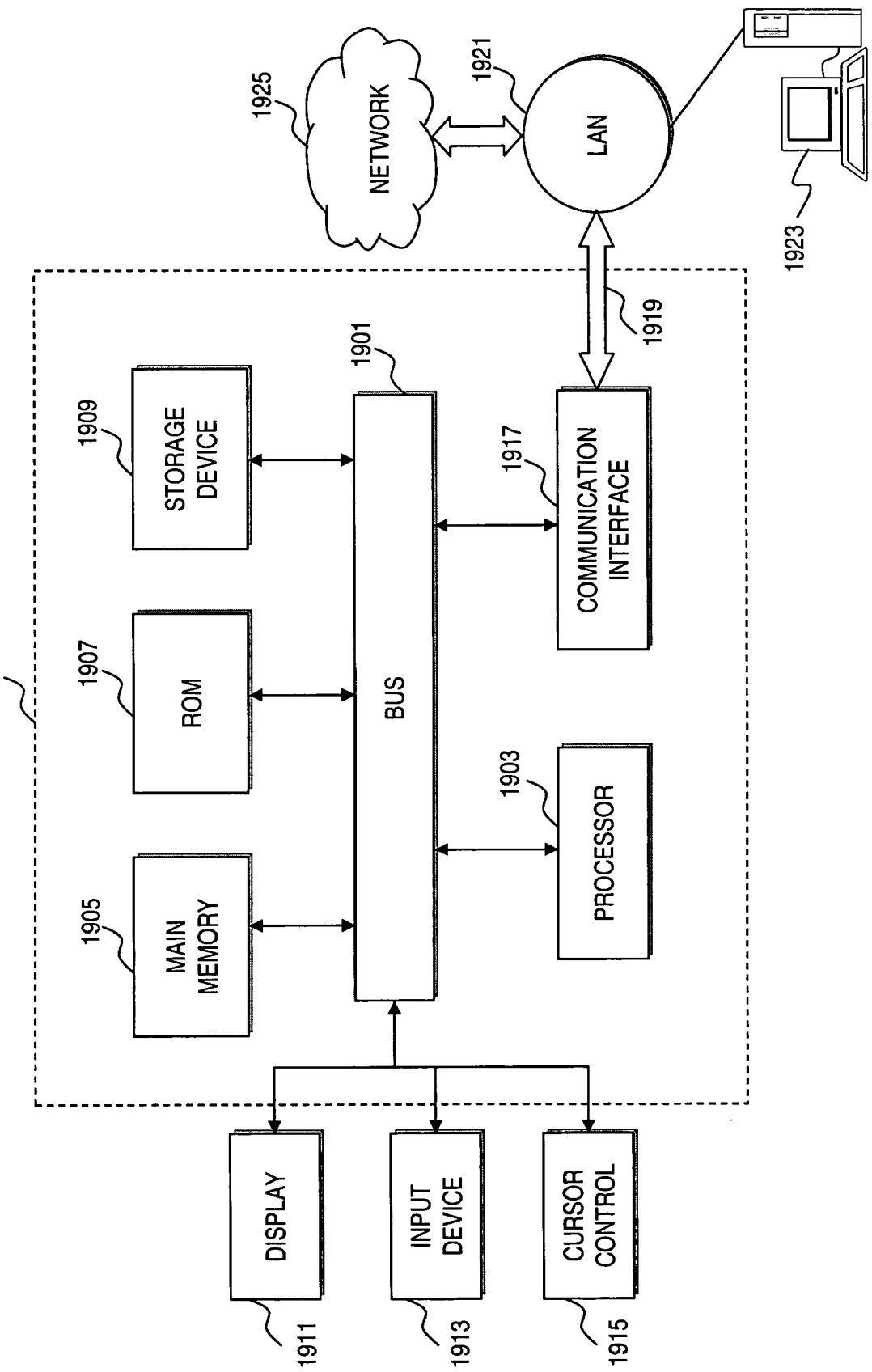
FIG. 19 is a diagram of a computer system that can be used to implement various embodiments of the present invention.

FIG. 19 illustrates a computer system 1900 upon which an embodiment according to the present invention can be implemented. For example, the processes described herein can be implemented using the computer system 1900. The computer system 1900 includes a bus 1901 or other communication mechanism for communicating information and a processor 1903 coupled to the bus 1901 for processing information. The computer system 1900 also includes main memory 1905, such as a random access memory (RAM) or other dynamic storage device, coupled to the bus 1901 for storing information and instructions to be executed by the processor 1903. Main memory 1905 can also be used for storing temporary variables or other intermediate information during execution of instructions by the processor 1903. The computer system 1900 may further include a read only memory (ROM) 1907 or other static storage device coupled to the bus 1901 for storing static information and instructions for the processor 1903. A storage device 1909, such as a magnetic disk or optical disk, is coupled to the bus 1901 for persistently storing information and instructions.

The computer system 1900 may be coupled via the bus 1901 to a display 1911, such as a cathode ray tube (CRT), liquid crystal display, active matrix display, or plasma display, for displaying information to a computer user. An input device 1913, such as a keyboard including alphanumeric and other keys, is coupled to the bus 1901 for communicating information and command selections to the processor 1903. Another type of user input device is a cursor control 1915, such as a mouse, a trackball, or cursor direction keys, for communicating direction information and command selections to the processor 1903 and for controlling cursor movement on the display 1911.

According to one embodiment of the invention, the processes described herein are performed by the computer system 1900, in response to the processor 1903 executing an arrangement of instructions contained in main memory 1905. Such instructions can be read into main memory 1905 from another computer-readable medium, such as the storage device 1909. Execution of the arrangement of instructions contained in main memory 1905 causes the processor 1903 to perform the process steps described herein. One or more processors in a multi-processing arrangement may also be employed to execute the instructions contained in main memory 1905. In alternative embodiments, hard-wired circuitry may be used in place of or in combination with software instructions to implement the embodiment of the present invention. Thus, embodiments of the present invention are not limited to any specific combination of hardware circuitry and software.

The computer system 1900 also includes a communication interface 1917 coupled to bus 1901. The communication interface 1917 provides a two-way data communication coupling to a network link 1919 connected to a local network 1921. For example, the communication interface 1917 may be a digital subscriber line (DSL) card or modem, an integrated services digital network (ISDN) card, a cable modem, a telephone modem, or any other communication interface to provide a data communication connection to a corresponding type of communication line. As another example, communication interface 1917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1917 sends and receives electrical, electromagnetic, or optical signals that carry digital data streams representing various types of information. Further, the communication interface 1917 can include peripheral interface devices, such as a Universal Serial Bus (USB) interface, a PCMCIA (Personal Computer Memory Card International Association) interface, etc. Although a single communication interface 1917 is depicted in FIG. 19, multiple communication interfaces can also be employed.

The network link 1919 typically provides data communication through one or more networks to other data devices. For example, the network link 1919 may provide a connection through local network 1921 to a host computer 1923, which has connectivity to a network 1925 (e.g. a wide area network (WAN) or the global packet data communication network now commonly referred to as the "Internet") or to data equipment operated by a service provider. The local network 1921 and the network 1925 both use electrical, electromagnetic, or optical signals to convey information and instructions. The signals through the various networks and the signals on the network link 1919 and through the communication interface 1917, which communicate digital data with the computer system 1900, are exemplary forms of carrier waves bearing the information and instructions.

The computer system 1900 can send messages and receive data, including program code, through the network(s), the network link 1919, and the communication interface 1917. In the Internet example, a server (not shown) might transmit requested code belonging to an application program for implementing an embodiment of the present invention through the network 1925, the local network 1921 and the communication interface 1917. The processor 1903 may execute the transmitted code while being received and/or store the code in the storage device 1909, or other non-volatile storage for later execution. In this manner, the computer system 1900 may obtain application code in the form of a carrier wave.

The term "computer-readable medium" as used herein refers to any medium that participates in providing instructions to the processor 1903 for execution. Such a medium may take many forms, including but not limited to non-volatile media, volatile media, and transmission media. Non-volatile media include, for example, optical or magnetic disks, such as the storage device 1909. Volatile media include dynamic memory, such as main memory 1905. Transmission media include coaxial cables, copper wire and fiber optics, including the wires that comprise the bus 1901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

The following patent applications are incorporated herein by reference in their entireties: co-pending U.S. patent application Ser. No. 11/202,659 filed Aug. 12, 2005, entitled "Method and System for Providing Voice Over IP Managed Services Utilizing a Centralized Data Store"; and co-pending U.S. patent application Ser. No. 11/202,589, filed Aug. 12, 2005, entitled "Fixed-Mobile Communications with Mid-Session Mode Switching."

APPENDIX

2G $2^{nd}$ Generation
3G $3^{rd}$ Generation
4G $4^{th}$ Generation
AAA Authentication, Authorization, and Accounting
ACK Acknowledgement
AIB Authenticated Identity Body
ALG Algorithm
ANM Answer Message
API Application Programming Interface
ASCII American Standard Code for Information Interchange
ASIC Application Specific Integrated Circuit
CA Certicificate Authority
CD Compact Disc
CIPID Contact Information for Presence Information Data Format
CPE Customer Premise Equipment
CPU Central Processing Unit
CRT Cathode Ray Tube
DSL Digital Subscriber Line
DDOS Distributed Denial of Service
DHCP Dynamic Host Configuration Protocol
DMZ Demilitarized Zone
DNS Domain Name Service/System
DVD Digital Versatile Disc (formerly Digital Video Disc)
EAP Extensible Authentication Protocol
ENUM Electronic Number
EPROM Erasable Programmable Read Only Memory
FPGA Field Programmable Gate Array
GUI Graphical User Interface
HTML HyperText Markup Language
HTTP HyperText Transfer Protocol
IAM ISUP Initial Address Message (IAM)
ICE Interactive Communication Establishment
IETF Internet Engineering Task Force
IIS Internet Information Services
IM Instant Messaging
IP Internet Protocol
IP-IC IP Interconnect
IPSec IP Security
IPTEL IP Telephony
ISDN Integrated Digital Services Network
ISP Internet Service Provider
ISUP ISDN User Part
ITU International Telecommunication Union
JNI Java™ Native Interface
LAN Local Area Network
LDAP Lightweight Directory Access Protocol
MAC Medium Access Control
MIME Multipurpose Internet Mail Extensions
NAPTR Naming Authority Pointer
NAT Network Address Translation
NIC Network Interface Card
OSS Operational Support System
PBX Private Branch Exchange
PCMCIA Personal Computer Memory Card International Association
PDA Personal Digital Assistant
PIDF Presence Information Data Format
POTS Plain Old Telephone Service
PROM Programmable Read Only Memory
PSTN Public Switched Telephone Network
RAM Random Access Memory
ROM Read Only Memory
RFC Request For Comment
RPID Rich Presence Information Data Format
RTP Real-Time Transport Protocol
RTCP Real-Time Control Protocol
SIMPLE SIP IM Protocols Leveraging Extentions
SIP Session Initiation Protocol
SIP-T Session Initiation Protocol for Telephones
SIPPING Session Initiation Proposal Investigation
S/MIME Secure/Multipurpose Internet Mail Extentions
SLA Service Level Agreement
SMS Short Messaging Systems
SOA IT Service Oriented Architecture Information Technology
SOAP Simple Object Access Protocol
SRTP Secure Real-Time Transport Protocol
STUN Simple Traversal of UDP
TCP Transmission Control Protocol
TDM Time Division Multiplexing
TLS Transport Layer Security
TURN Traversal Using Relay NAT UA User Agent
UDDI Universal Description, Discovery and Integration
UDP User Datagram Protocol
URI Uniform Resource Indentifier
URL Uniform Resource Locator
VoIP Voice Over IP
VPN Virtual Private Network
WAN Wide Area Network
Wi-Fi™ Wireless Fidelity
WiMax Worldwide Interoperability for Microwave Access
WLAN Wireless Local Area Network
XCAP XML Configuration Access Protocol
XCON Centralized Conferencing
XML Extensible Markup Language

What is claimed is:

1. A method for providing communication services, the method comprising:
receiving a request, at a proxy server, for establishing a voice call from a source endpoint behind a first network address translator of a first domain, wherein the proxy server provides signaling for establishment of the voice call and the request specifies a directory number of a destination endpoint within a second domain;
converting signaling from another proxy server associated with establishment of the voice call to a format compatible with the proxy server;
selectively determining a network address for communicating with the destination endpoint based on the directory number;
determining existence of a second network address translator within the second domain; and
if the network address can be determined, establishing a media path between the source endpoint and the destination endpoint based on the network address to support the voice call.

2. A method according to claim 1, wherein the step of determining the network address is performed by an ENUM (Electronic Number) server, the step of supporting is performed by a STUN (Simple Traversal of UDP (User Datagram Protocol)) server, and the step of establishing is performed by a TURN (Traversal Using Relay NAT (Network Address Translation)) server, each of the servers being managed by a service provider.

3. A method according to claim 2, wherein the media path is established through the TURN server, and a proxy server directs the voice call over the media path.

4. A method according to claim 1, wherein the voice call is a Voice over IP (Internet Protocol) call.

5. A method according to claim 1, wherein the first domain and the second domain correspond either to different enterprise networks or autonomous networks.

6. A method according to claim 1, wherein the proxy server is located within a service provider network or the first domain.

7. A method according to claim 1, wherein the proxy server utilizes Session Initiation Protocol (SIP) signaling, and the other proxy server utilizes either a SIP-type signaling or a H.323 signaling.

8. A method according to claim 1 further comprising:
if the network address cannot be determined, signaling a media gateway coupled to a circuit-switched telephone network for termination of the voice call.

9. A system for providing managed communication services, the system comprising:
a proxy server configured to receive a request for establishing a voice call from a source endpoint behind a first network address translator of a first domain, wherein the request specifies a directory number of a destination endpoint within a second domain;
an address server configured to selectively determine a network address for communicating with the destination endpoint based on the directory number;
a STUN (Simple Traversal of UDP (User Datagram Protocol)) server configured to support determination of existence of a second network address translator within the second domain;
a TURN (Traversal Using Relay NAT (Network Address Translation)) server configured to establish, if the network address can be determined, a media path between the source endpoint and the destination endpoint based on the network address to support the voice call,
wherein, if the network address cannot be determined, the proxy server communicates with a media gateway coupled to a circuit-switched telephone network for termination of the voice call.

10. A system according to claim 9, wherein the proxy server directs the voice call over the media path.

11. A system according to claim 9, wherein the voice call is a Voice over IP (Internet Protocol) call.

12. A system according to claim 9, wherein the first domain and the second domain correspond either to different enterprise networks or autonomous networks.

13. A system according to claim 9, further comprising:
a gateway configured to convert signaling from another proxy server associated with establishment of the voice call to a format compatible with the proxy server.

14. A system according to claim 9, wherein the proxy server utilizes Session Initiation Protocol (SIP) signaling, and the other proxy server utilizes either a SIP-type signaling or a H.323 signaling.

15. A system for providing communication services, the system comprising:
means for receiving a request, at a proxy server, for establishing a voice call from a source endpoint behind a first network address translator of a first domain, wherein the proxy server provides signaling for establishment of the voice call and the request specifies a directory number of a destination endpoint within a second domain;
means for converting signaling from another proxy server associated with establishment of the voice call to a format compatible with the proxy server;
means for selectively determining a network address for communicating with the destination endpoint based on the directory number;
means for determining existence of a second network address translator within the second domain; and
means for establishing a media path between the source endpoint and the destination endpoint based on the network address to support the voice call, if the network address can be determined.

16. A system according to claim 15, wherein the selectively determining means is an ENUM (Electronic Number) server, the determining means is a STUN (Simple Traversal of UDP (User Datagram Protocol)) server, and the establishing means is a TURN (Traversal Using Relay NAT (Network Address Translation)) server, each of the servers being managed by a service provider.

17. A system according to claim 16, wherein the media path is established through the TURN server, and a proxy server directs the voice call over the media path.

18. A system according to claim 15, wherein the voice call is a Voice over IP (Internet Protocol) call.

19. A system according to claim 15, wherein the first domain and the second domain correspond either to different enterprise networks or autonomous networks.

20. A system according to claim 15 wherein the proxy server is located within a service provider network or the first domain.

21. A system according to claim 15 wherein the proxy server utilizes Session Initiation Protocol (SIP) signaling, and the other proxy server utilizes either a SIP-type signaling or a H.323 signaling.

22. A system according to claim 15, further comprising:

means for signaling a media gateway coupled to a circuit-switched telephone network for termination of the voice call, if the network address cannot be determined.

* * * * *